Figure 2:
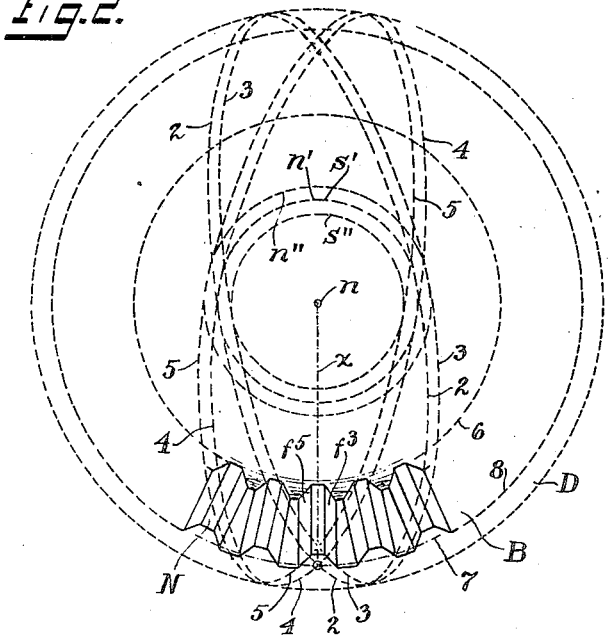

H. D. WILLIAMS.
BEVEL GEARING.
APPLICATION FILED APR. 14, 1913.

1,112,509.

Patented Oct. 6, 1914.
7 SHEETS—SHEET 1.

Witnesses:

Inventor:
Harvey D. Williams
By his Atty.

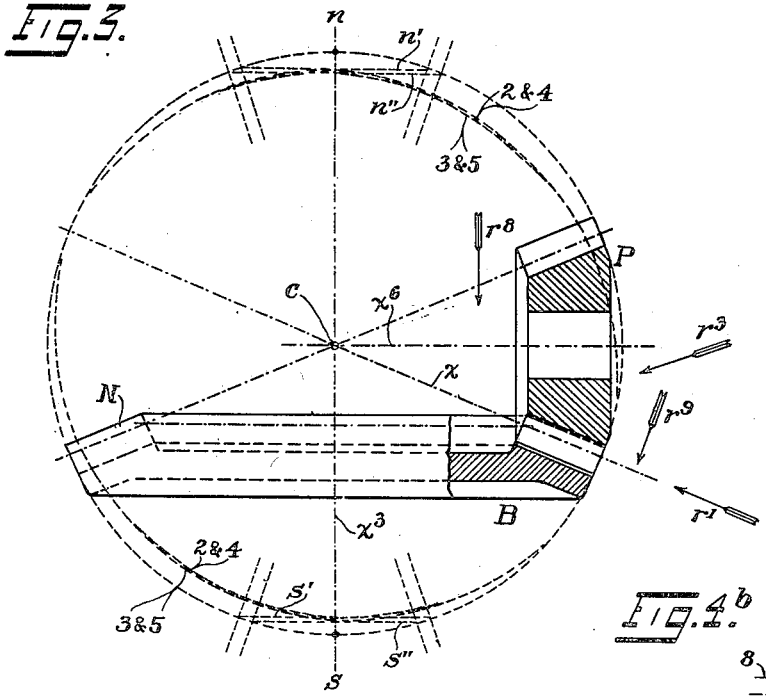
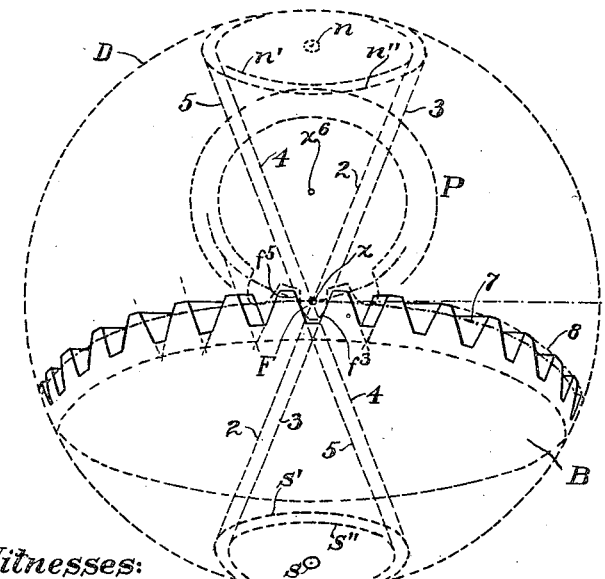
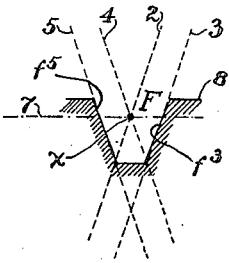

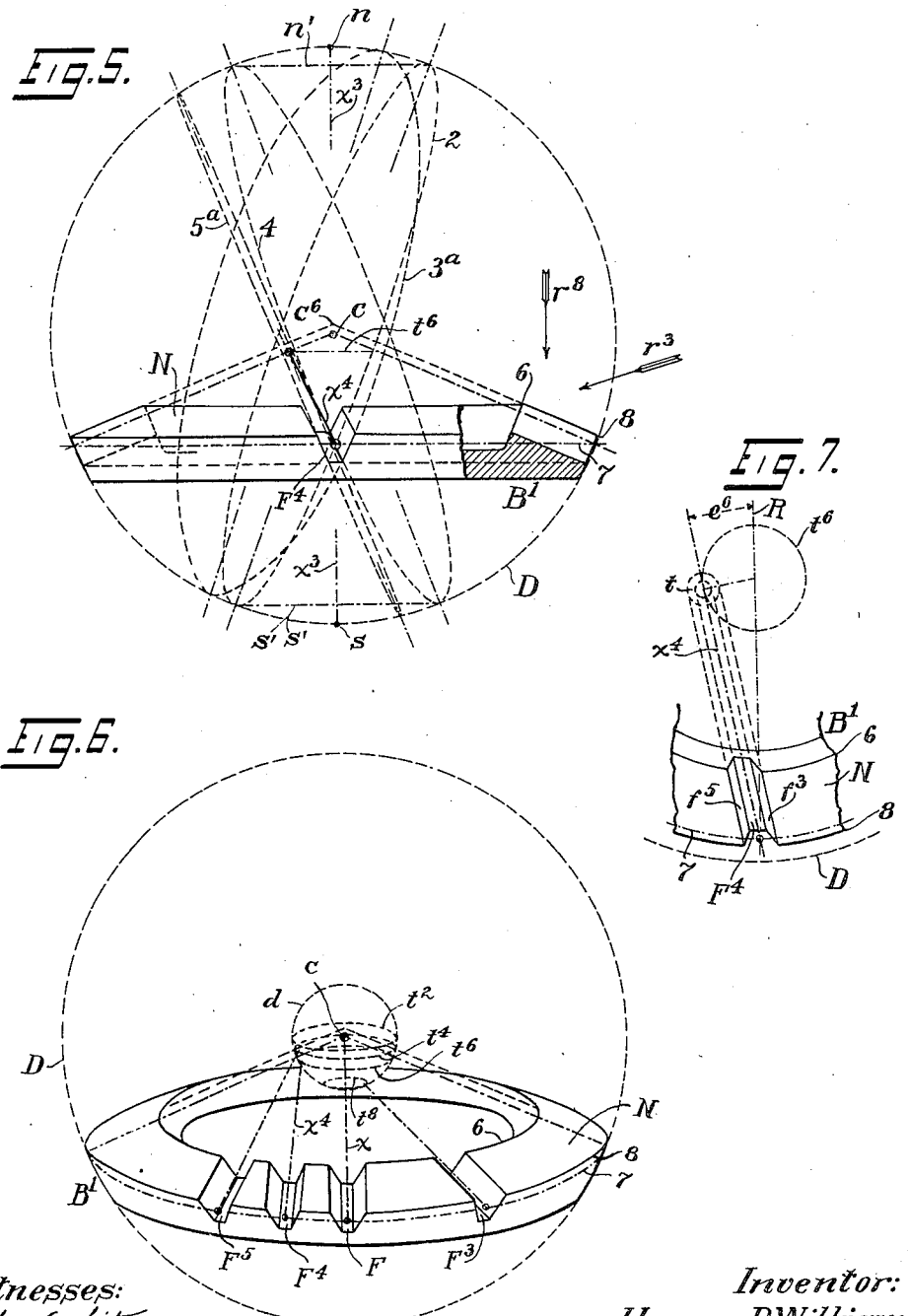

H. D. WILLIAMS.
BEVEL GEARING.
APPLICATION FILED APR. 14, 1913.
1,112,509.
Patented Oct. 6, 1914.
7 SHEETS—SHEET 4.
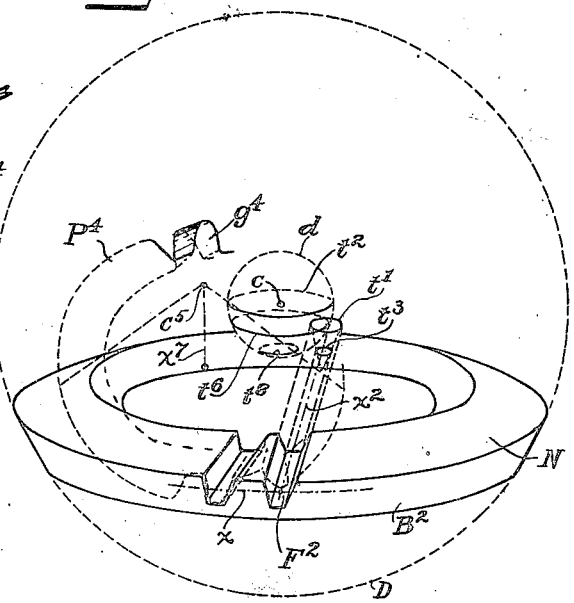
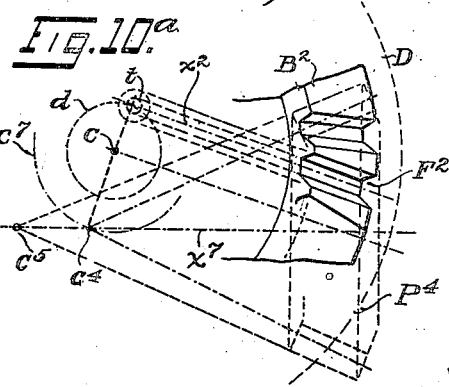
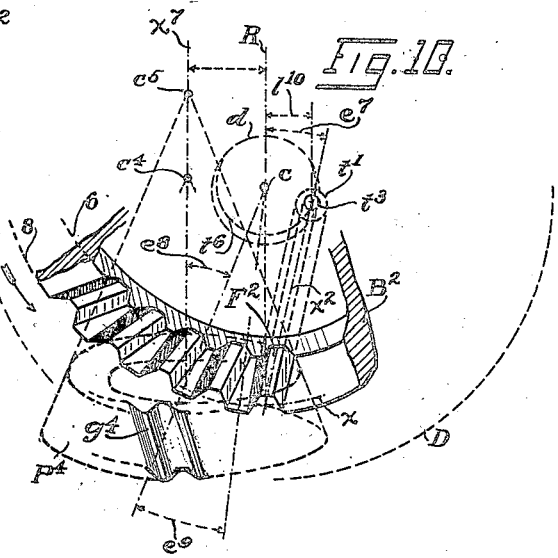
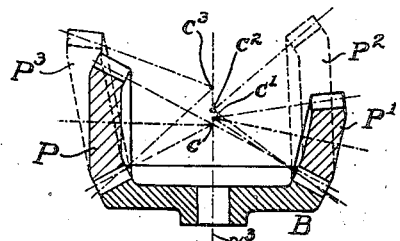
Witnesses:
Chas. E. Whiteman
H. D. Penney
Inventor
Harvey D. Williams
By his Att'y, F. H. Richards

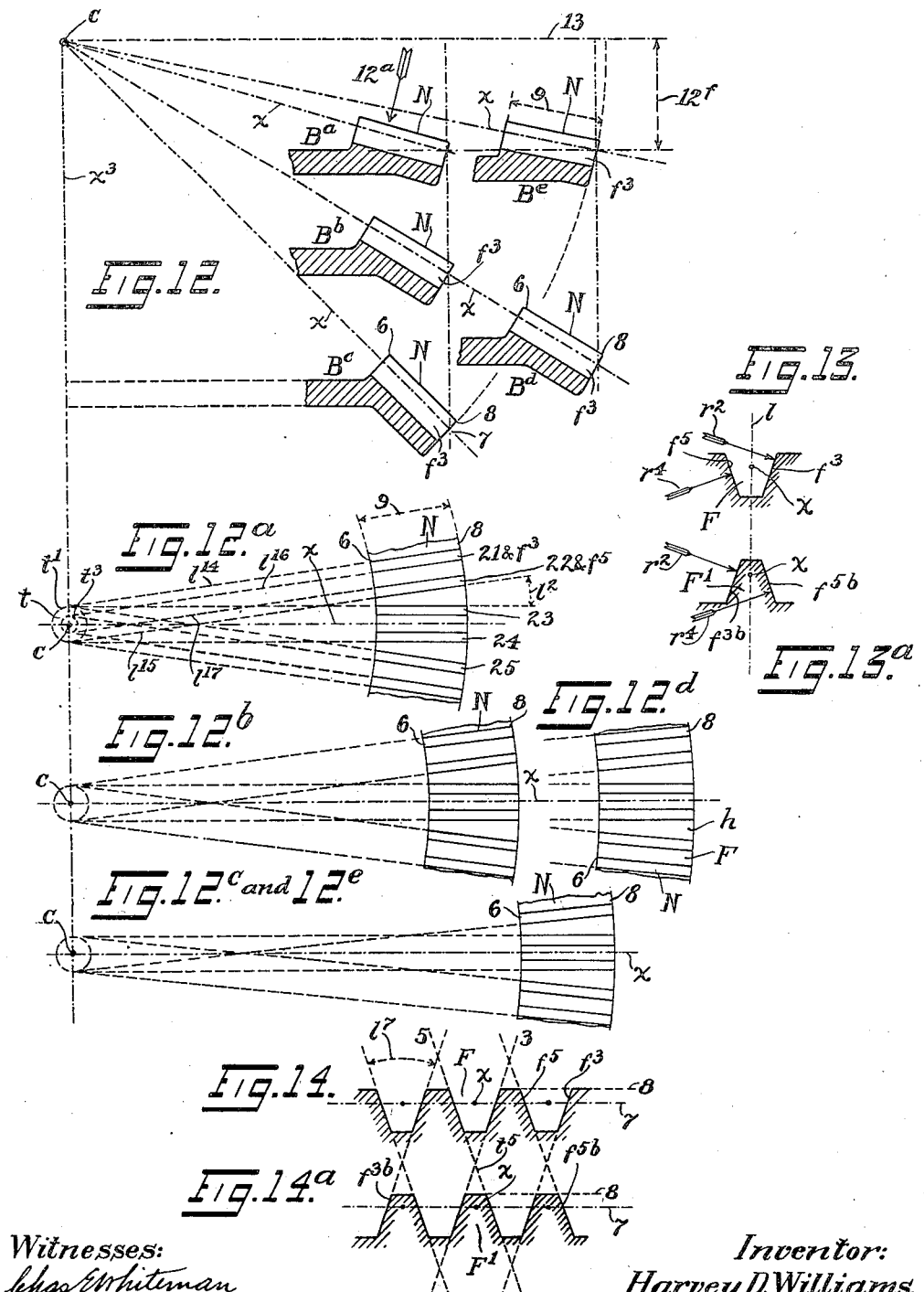

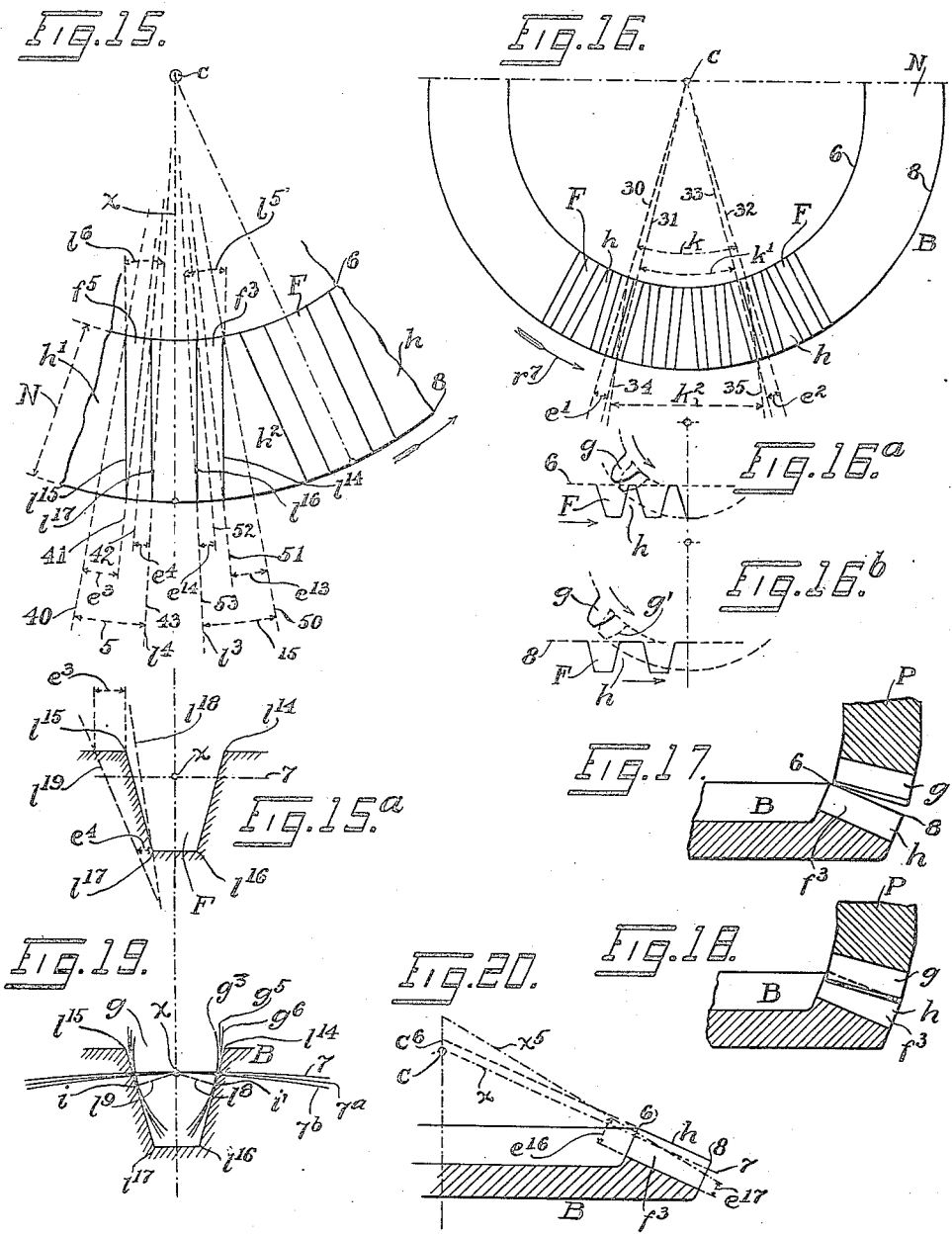

H. D. WILLIAMS.
BEVEL GEARING.
APPLICATION FILED APR. 14, 1913.
1,112,509.
Patented Oct. 6, 1914.
7 SHEETS—SHEET 7.
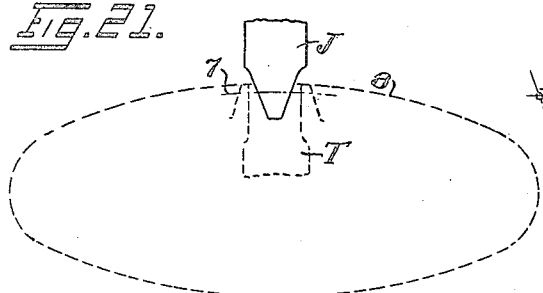
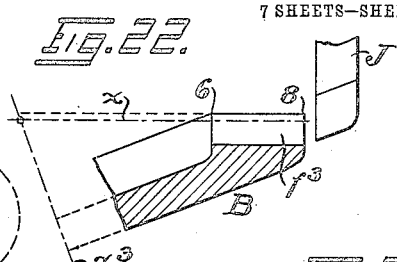
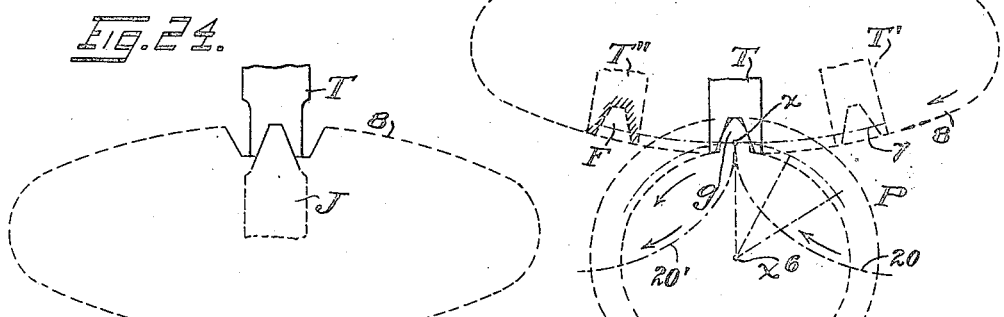
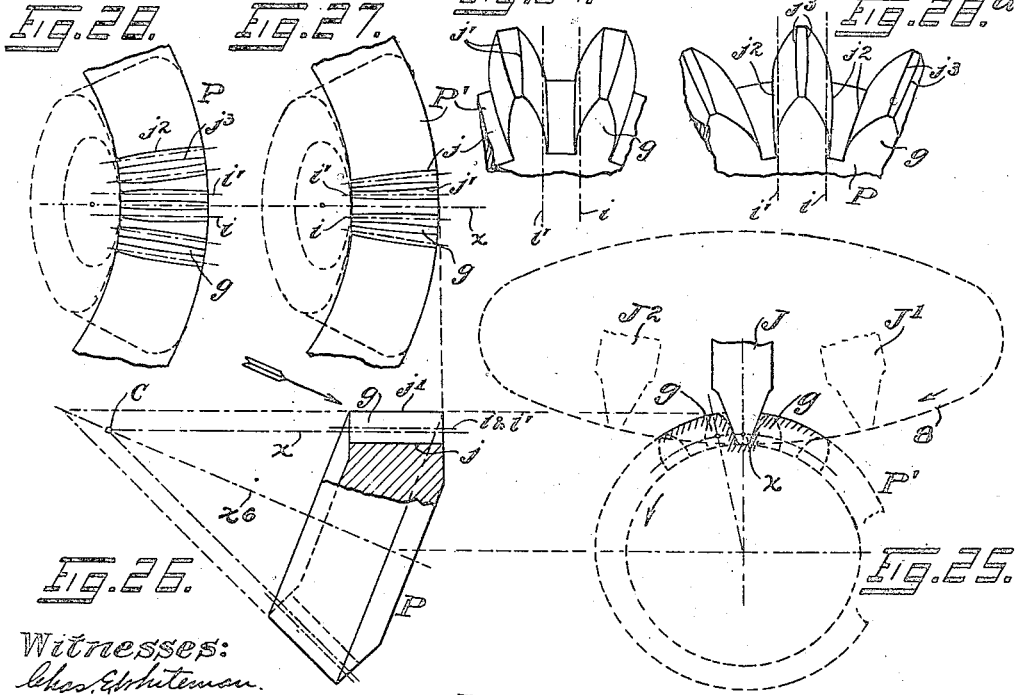
Witnesses:
Inventor: Harvey D. Williams,
By his Att'y, F. H. Richards.

UNITED STATES PATENT OFFICE.

HARVEY D. WILLIAMS, OF NEW YORK, N. Y., ASSIGNOR TO GEAR IMPROVEMENT COMPANY, INC., OF NEW YORK, N. Y., A CORPORATION OF NEW YORK.

BEVEL-GEARING.

1,112,509.  Specification of Letters Patent. Patented Oct. 6, 1914.

Application filed April 14, 1913. Serial No. 760,861.

*To all whom it may concern:*

Be it known that I, HARVEY D. WILLIAMS, a citizen of the United States, residing in New York City, in the county of New York and State of New York, have invented certain new and useful Improvements in Bevel-Gearing, of which the following is a specification.

The principal object of this invention is to furnish bevel-gearing organized and adapted for being manufactured of a higher quality or standard of uniformity and precision, than heretofore practicable within the commercial limitations as to cost, especially when making the gears in large quantities. In view, therefore, of the increasing demand for bevel-gears of a higher precision at a lower cost, and the practical difficulty and relatively greater cost of maintaining a high precision when the tooth-faces have curved surfaces, I have devised a system of bevel-gear construction wherein plane-surfaces may be used for the tooth-faces of the wheel, and have also arranged these plane tooth-faces in pairs in which these plane working surfaces may be located in longitudinal parallelism, so that the wheel-teeth may be made by single-reproduction, and without requiring difficult or expensive methods or appliances.

In view of the intricate kinematical relations involved in the art of bevel-gearing, and to facilitate a clear presentation of the distinguishing features of my present improvements, I have herein employed the term "wheel" for designating the bevel-gear having the teeth thereof provided with the plane-surface working-faces, and have designated the mating gear as the "pinion", without regard, however, to their relative actual sizes but having in mind that usually the wheel is larger than the pinion, and that while either one may be used as the driver, the smaller said gear will preferably and usually be the pinion and be employed as the driving member of the pair of gears.

It is well known that in mechanism generally, plane-surfaces if not of large size (and with the exception, possibly, of small cylinders), are producible in duplicate in large numbers with the greatest facility and economy and within the minimum practicable limit of variation in precision and in the quality of the surface. Accordingly, in my improved bevel-gearing, I provide the larger member, or "wheel" with working-faces in the form of precisionized planes, and arrange these plane-surfaces in longitudinal parallelism, and in a transversely converging relation to each other. The conjugate or evolution form of tooth is thus restricted to one gear (the pinion) of the pair, while the other gear, or wheel, has non-evolved teeth of a shape and relative size which are more readily producible with the required high degree of precision, and which are both producible and repairable by the use of simple and ordinary appliances, and without the use of the complex and expensive generating machines for forming or shaping the tooth-faces.

While the well-known epicycloidal and involute systems of gear-teeth construction, as applied to the conically modified teeth of bevel-gears, have always been recognized as being radically different and distant, the one from the other,—and both different from Willis' odontograph system,—yet the difference between any two of these kinds of bevel-gears is clearly less, both practically and theoretically, than is the difference between either one of those systems and the system which I have herein illustrated and explained. For instance, in both the epicycloidal system and the involute system, the cross-sectional profile of the tooth-face is some kind of a rolled-curve, thus making the two systems alike in one of their principal features. In my present system, on the contrary, no kind of rolled curves are used in either wheel or pinion; curved profile-lines of any kind are not used on one gear of the pair; and, the conical-modification of the teeth as used in those old systems, is here entirely discarded.

In order to fully understand the nature and scope of the present improvements, it should be remembered that a very great proportion of all those kinds of bevel-gears which are now duplicated in large numbers, have the pitch-cone ratio of pinion and wheel within the approximate limits of one-to-two and one-to-four, and that this range of proportions applies to such bevel-gearing as employed in many standard and special machines, and particularly in automobiles. Also, it will be remembered, that generally the rate of wear of the teeth on the two gears, respectively, is substantially in inverse proportion to the numbers of teeth thereon. Thus in a pair of bevel-gears having respectively twenty and sixty teeth, the wear of the teeth on the twenty-tooth pinion evidently would be normally three times as great as on the sixty-tooth wheel. Thus the more rapid wear of the teeth of the smaller wheel, tends to continuously maintain and shape these teeth to the proper conjugate form for working correctly with the teeth of the larger wheel.

Assuming that the gear and pinion ratios average one to three, then it is evident that three-fourths of the whole number of teeth, in this kind of gearing, can now be made without the use of "generating" machines, and without employing the "evolution" method, and still have the gears operate as truly and accurately as if the teeth of both gears were made by that method in gear-tooth generating machines.

While the present improvements are not intended for use in bevel-gears of some proportions and sizes,—especially as regards the ratio of pitch-circles and the relative numbers and sizes of the teeth,—these restrictions in the range of applicability are accompanied by important advantages,—not otherwise or heretofore practically obtainable,—in mode of operation and facility of manufacture in kinds of bevel-gearing which have become of the greatest commercial importance; and thus I utilize to the advantage of a large class of cases, certain features not equally applicable to the whole range of bevel-gearing.

A further object of my present invention is to furnish bevel gearing in which the larger gear or "wheel", in the pair shall constitute a master-wheel adapted for operating correctly not only with pinions of varying diameters and cone-angles, but with such pinions located with their axes in various degrees of divergence or axial skew, respectively, from an axial-plane radial to the master-wheel axis, and also from the plane of rotation of the wheel. In this system of bevel-gearing, therefore, one bevel master-wheel may be practically and successfully employed in mesh with pinions of different diameters and cone-angles, and with pinions having their cone-axes in the plane of or divergent from the plane of the master-wheel axis. In this system, all of the bevel-gear wheels which are of some one given pitch,—especially when the cone-angle of the wheel which is within the range (as hereinafter described) of the major-cones,—may have their teeth, or tooth-spaces, as the case may be, all of the same size and shape, all of the mating pinions being, preferably, such as have their cone-angle within the range of the minor-cones of the system, these several terms and features being hereinafter explained and defined by the description in connection with diagrammatic drawings illustrating the same.

For more readily explaining and distinguishing the nature and scope of my invention, I have in the accompanying drawings forming a part of this specification, illustrated the principles and structural features of the gearing in connection with geometrical representations of the wheel-including sphere and certain of its great-circles, thus following the well-known graphical method usually adopted by the leading authorities on kinematics.

Figure 1:
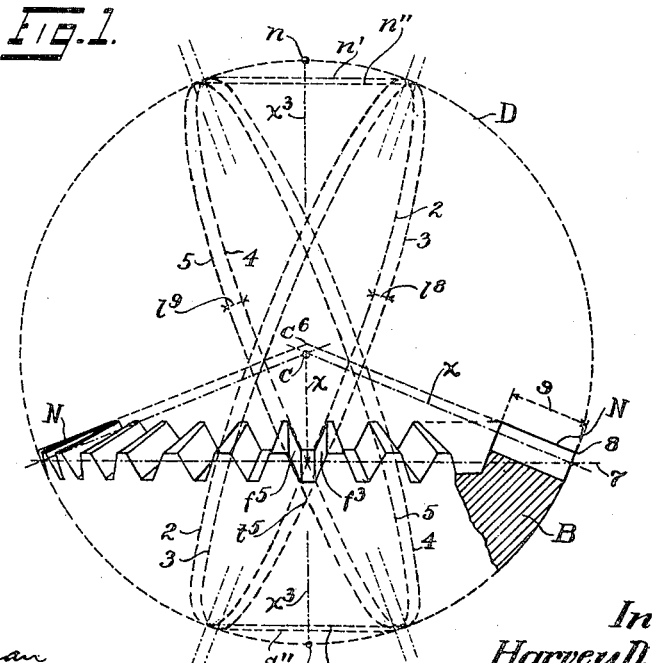

In the drawings, Figure 1 is a side view of a partially-formed conical bevel-gear wheel, B, with geometrical delineations of the wheel-including sphere, D, and of the circles and lines (including the "great-circles" 2 and 4), relating to the derivation of the master-form for, and the location of, the plane-surface tooth-faces of the wheel, and with the skew-angle of the master-form axis reduced substantially to zero. Fig. 2 is a plan view of the features shown in Fig. 1, as seen from above in that view, and further illustrates the feature of parallelism in the tooth-surfaces. Fig. 3 is a side view as seen from the left-hand in Fig. 2. Fig. 4 is an oblique side view of the features illustrated in Figs. 1, 2 and 3, (but with certain additions thereto) as seen from the direction of the arrow $r^1$, in Fig. 3. Fig. 4$^a$ is a fragmentary and enlarged view further illustrating the features shown in the middle part of Fig. 4, particularly as to the location on the sphere D of the profiles of the wheel and pinion teeth; this view is drawn with the master form axis $x$ in alinement with the same axis in Fig. 4, to facilitate comparison. Fig. 4$^b$ is a view similar to, and is drawn in alinement above, Fig. 4$^a$, for showing how the offset-circles, as 3$^b$, 5$^b$, may be offset from the intersecting great-circles 2 and 4, respectively, in reversed directions from this arrangement in Figs. 1, 4 and 4$^a$, for bringing the planes of the tooth faces into the outwardly-converging construction. Fig. 5 is a side view similar to Fig. 1, but showing the offset planes (as 3 and 5, Figs. 1, 2, 3 and 4) of the tooth faces, as being offset or swung into an angular or skew position, for thereby giving a substantial skew-angle to the axis, $x^4$, without any substantial change in the tooth profile. Fig. 6 is an oblique side view, analogous to Fig. 1, but as seen from the direction and at the angle of the arrow $r^3$, Figs. 3 and 5, skew-angle of the master-form-axis is not reduced to zero; in this view the master-form F$^4$ is shown skew-located and as having the same skew-angle as shown in Fig. 5. Fig. 7 is a fragmentary plain view of the middle portion of Figs. 5 and 6, as seen in the direction of the arrow $r^8$, Figs. 3 and 5, for more clearly showing the skew-angle, $e^6$, corresponding with the tangency or skew-circle $t^6$, in said Figs. 5 and 6,—also in Fig. 9. Fig. 8 is a diagrammatic view similar to the right-hand portion of Fig. 3, for showing certain relations between the wheel, (here designated as $B^2$) and a co-meshing pinion of non-normal proportions. Fig. 9 is a diagrammatic perspective view similar to Fig. 6,—and as seen in the direction of the arrow $r^5$ in Fig. 8,—for further illustrating the skew location of the wheel teeth, and how this form of wheel, as $B^2$, may be operated with a skew-located pinion of non-normal proportions, particularly when the skew-angles of master-form axis and pinion axis, respectively, are oppositely located relatively to the wheel axis. Fig. 10 is a view of a portion of Fig. 9, but shows the parts as seen in the direction of the arrow $r^6$ in Fig. 8. Fig. 10$^a$ is a fragmentary plan view (comparable with Fig. 7) of a portion of Fig. 10, but is drawn in projection with and below Fig. 8, for more clearly indicating certain features shown in the companion views, Figs. 8, 9 and 10, of this group of the drawings. Fig. 11 is a sectional view showing the wheel B, (which may also correspond with the forms $B^1$ or $B^2$ thereof) and a plurality of pinions operable therewith and including pinions of normal and non-normal proportions. Fig. 12 is a diagram corresponding to Fig. 3 and to Fig. 3$^b$, for illustrating the making of any plurality of bevel-wheels all having the same pitch and one size and form of tooth, whatever may be the diameter of the tooth-circles of the several wheels, of which five different specific cases are shown, all designated as the wheel B, and individually distinguished by the reference characters $B^a$, $B^b$, $B^c$, $B^d$ and $B^e$. This range of wheel-cones, as here illustrated, extends from the cone-angle of 45 degrees, (equal to an inclusive angle of 90 degrees), from the line $x$ in wheel $B^c$, and upwardly therefrom to any cone-angle below the line 13, (which indicates a plane of revolution), and this range of the larger cone-angles is herein, for convenience, designated as the "range of the major-cones". These several proportional variations in the wheel B are further illustrated in Figs. 12$^a$ to 12$^e$ inclusive, each showing a short portion of the tooth zone N as seen in a direction vertically thereto. Fig. 12$^a$, for instance, shows part of the wheel $B^a$ as seen in the direction of arrow 12$^a$, Fig. 12, and with the cone-face length, from $c$ to 8, laid off from the axial line $x^3$ as a meridian for these views. Fig. 12$^b$ similarly shows the cone-length and the pitch angles of wheel $B^b$. The same features of wheel $B^c$ are shown in Fig. 12$^c$; of wheel $B^d$, in Fig. 12$^d$; of wheel $B^e$, in Fig. 12$^e$. In these views the smaller wheels $B^a$, $B^b$, $B^c$, are of the same diameter; wheels $B^b$ and $B^d$ are of the same cone-angle, but widely differing diameters; the larger wheels $B^e$ and $B^d$ are of the same diameters and different cone-angles; the wheels $B^c$ and $B^e$ have the same cone-length, with different cone-angles and, also, different diameters; and, the wheels $B^a$ and $B^e$ have their pitch circles located the same distance, 12$^f$, from the equatorial plane 13, through the apex $c$, which is common to the normal pitch-cones of all the wheels. The term cone-angle, as here employed usually refers to the inclusive angle, as, for instance, in Fig. 12, where the wheel $B^c$ is indicated as having an inclusive angle of ninety degrees, while the cone-angles of the other wheels as $B^a$, $B^e$, are all much larger. Figs. 13 and 13$^a$ are views similar to Figs. 4$^a$ and 4$^b$, respectively, for illustrating the two arrangements of the tooth-planes convergence, and for explaining certain operational features thereof, in connection with Figs. 12 to 12$^e$, and other preceding views. Figs. 14 and 14$^a$ are two connected views together forming a diagram further illustrating certain features which are particularly set forth in Figs. 1 to 4$^b$, inclusive. Fig. 15 is an enlarged and fragmentary plan or face view similar and supplemental to, Fig. 12$^a$, for diagrammatically showing the arrangement and relations in the tooth-zone of successive tooth-faces; and to facilitate such illustration, the several arcs and angles relating to the said features are shown circumferentially increased to about twice the ratios given in the principal views. Fig. 15$^a$ is a diagram similar to Fig. 4$^a$, but connected and drawn in projection with Fig. 15 for more clearly showing the skew-location and the circumferential advance of the tooth-surfaces. Fig. 16 is a plan-view diagram corresponding with Fig. 2 for illustrating the progressive meshing of the pinion teeth with the tooth-faces of the wheel, and Figs. 16$^a$ and 16$^b$ are connected diagrams supplemental to Fig. 16 for further illustrating the same features as taking place during the passage of a wheel-tooth through the usual arc-of-approach; in Figs. 15 and 16, the views are taken in the direction of the arrow $r^9$, Fig. 3. Fig. 17 is a view similar to a portion of Fig. 3, for indicating the initial stage of the progressive meshing as occuring on the inner circle of the tooth-zone, as hereinafter explained in connection with Figs. 16, 16$^a$ and 16$^b$; and Fig. 18 is a similar view showing the same stage, as occurring on the outer circle of the tooth-zone of the wheel, when this has the improved master-form F in which the planes of the tooth faces are arranged with the inward convergence, as shown,—for comparison,—in Figs. 15 and 15$^a$. Figs. 19 and 20 are diagrams further illustrating certain features of the meshing gears, especially the "line-bearing" engagement of the pinion tooth-faces with the plane-surface faces of the wheel teeth. Figs. 21, 22 and 23 are diagrammatic views illustrative of the preferred method of making the gears when the wheel B (or any form thereof) has the tooth-face planes inwardly-converging, as in Figs. 1 to 4$^a$, inclusive, and in Figs. 5, 6, 7, 8, 9, 10, 10$^a$, 13 and 14. Figs. 24 and 25 are views similar to Figs. 21 and 23, respectively, for similarly illustrating the method when applied to the making of gears in which the said tooth-face planes are outwardly-converging, as in Figs. 4$^b$, 13$^a$ and 14$^a$. Fig. 26 is a side view, chiefly diagrammatic, of the pinion, P, as seen from the left-hand in Fig. 25; these two views are drawn in alinement to facilitate the comparison thereof. Fig. 27, is a face view of a portion of the pinion as seen from above in Fig. 26, with this difference however, that the tooth-zone is here shown as if the pitch-surface, (the geometric cone of revolution formed by the tooth-form axis, as Figs. 3, 19 and 22, when revolved about the pinion-axis $x^6$, Figs. 3 and 23), were enrolled into a plane, for thereby bringing all the pinion-teeth to stand as if vertically disposed in a plan view, to facilitate description and comparison. Fig. 28, is a view in all respects similar to Fig. 27, with the exception, that whereas in Fig. 27 the geometric master-form is applied to the tooth-spaces, (in correspondence with Figs. 24, 25, and with Figs. 4$^b$, 13$^a$ and 14$^a$), this master-form is here shown applied in Fig. 28, to the pinion-teeth, thus producing the form of pinion-tooth having the longitudinally-parallel construction or configuration and with the intervening tooth-spaces of the longitudinally-tapering formation. Fig. 27$^a$ is an enlarged fragmentary view showing a pair of pinion teeth corresponding to those indicated in Fig. 27, as seen in the direction of the arrow in Fig. 26. Fig. 28$^a$ is a view similar to Fig. 27$^a$, but showing pinion teeth and spaces arranged as in Fig. 28, and with these teeth having their wheel-engaging surfaces conforming to the compound-reproduction configuration, which is hereinafter more fully explained.

Similar characters designate like parts in all the views.

In this improved bevel-gearing, a pair of bevel-gears will usually comprise a conical wheel having plane-surface tooth-faces arranged in parallel with an axis which at its outer end coincides with the intersection of two great-circles of a wheel-including sphere to the center of which said axis may have, relatively, a skew-location. The said tooth-face planes lie in the planes of two circles which are, respectively, parallel to said great-circles, and may be offset by equal distances outwardly therefrom, thereby making the longitudinal, or lengthwise parallelism to the tooth-spaces of the wheel.

Before proceeding to more complete and detailed description, it should be understood that of the two arrangements of the system herein illustrated, the transverse convergence of the longitudinally-parallel planes which is shown in Figs. 4$^b$ and 13$^a$ (also indicated in Figs. 14$^a$, 24, and in 25 to 27$^a$,), is regarded as the primary arrangement, since the figure or master-form, as F$^1$, is here applied to the two plane-surfaces of one tooth, or tooth-body, which therefore has a cross-sectional shape and size, and a configuration, coinciding with said master-form. Thus in the primary arrangement or organization, the said master-form may be said to be the " tooth-form," or to coincide therewith, and vice-versa. In the secondary and improved arrangement, as shown for instance in Figs. 1 to 4$^a$, (and in other figures elsewhere herein more fully explained), the same tooth-form figure or master-form—, as F, Figs. 4$^a$ and 13,—(which may also be defined as a system-form, and tooth-surface generant), is shown applied in a reversed manner to the inwardly-converging and adjacent plane-surfaces, as $f^3$ and $f^5$ (Figs. 4, 4$^a$), which are the two bounding planes of a tooth-space having the longitudinal parallelism; and each of these two space-bounding planes is also a bounding plane of a tooth having a longitudinal-angle greater than the angle subtended by the pitch-arc, (see diagrams Figs. 15 and 16 and the description therof). In the said primary organization, therefore, the master-form, (see Fig. 4$^b$), directly coincides with the pair of geometric plane-surfaces,—these being in the longitudinal-parallelism,—in which lie the pinion-engaging tooth-surfaces, as $f^{3b}$ and $f^{5b}$, (Fig. 4$^b$), of the wheel-teeth. But in said secondary arrangement, the same master-form, Fig. 4$^a$, is shown applied in a reverse manner to a different pair of the geometric plane-surfaces,—these also being in longitudinal-parallelism,—in which lie the inwardly-converging and adjacent pinion-engaging tooth-surfaces, as $f^3$ and $f^5$, respectively, of two adjacent wheel-teeth, each of which has a longitudinal-angle greater than the angle subtended by the pitch-arc, (see Figs. 12$^a$, 15 and 16 and the description thereof). Thus in both the primary and secondary organizations the series of tooth-surface planes are arranged in two series of pairs, and in each said organization the pairs of one series have their planes in longitudinal-parallelism, while the planes of the other series have a longitudinal-angle greater than the angle subtended by the pitch-arc.

A master-wheel made according to either said organization,—the primary or the secondary,—has the pinion-engaging tooth-surfaces thereof consisting of plane-surfaces arranged in successive pairs in which each pair has the planes thereof transversely converging, and also in longitudinal-parallelism and conforming to the single-reproduction configuration; and a co-meshing conical pinion for operating in combination with either form of such master-wheel, will, conversely, have the wheel-engaging tooth-surfaces thereof curved to conform to a corresponding compound-reproduction configuration, (see especially Figs. 21 and 28ª, inclusive, and the description thereof.)

The "form" or configuration of a tooth-surface may be said to include the features of outline, or profile, and the relative position thereof. The character of the profile depends, of course, on the kind of reproduction, whether single, (as in the case of the wheel),—or compound, as in the case of the pinion; the position depending on the direction of the transverse convergence, whether inwardly or outwardly,—in one manner in the case of the primary arrangement, and in the reverse manner in the case of the reversed and secondary or improved arrangement. As thus applied to the wheel, each profile or side-line, (as $f^3$ or $f^5$, Fig. 4ª, of the form F), gives,—always by the same direct reproduction,—the shape or profile, and also the position or angular relation, to one tooth-surface in each said arrangement of the wheel construction. In the primary arrangement, the said master-form,—as represented in a tool (as T, Fig. 24), that is coincident therewith,—and by the use of the single-reproduction method, produces a pair of tooth-surfaces bounding the body of one and the same tooth, (Fig. 4ᵇ), and therefore gives to this tooth an actual sectional shape and size which is the exact counterpart of said master-form. In the secondary arrangement, the same results as to outline and relative position (Fig. 4ª) are produced (as by the tooth J, Figs. 21, 22), on the two adjacent tooth-surfaces of two adjacent tooth bodies, respectively, but with the sectional shape and size applied to the tooth-spaces.

It will be remembered that the custom of making a tooth section symmetrical with a central line, as $l$, Figs. 13 and 13ª, vertical to the plane of rotation, is for the purpose of enabling the gear wheels to be operated equally well in either direction. But when the wheels are running in some one direction (as, for instance, in the direction of the arrow $r^7$ Fig. 16), only the rearward faces, as $f^3$,—see Figs. 13, 14, 15,—(or when the tooth-form is reversed,—the faces $f^{3b}$, Figs. 13ª, 14ª) are the driving-faces of the wheel-teeth, in cases where this wheel, as B, is the driven member of the pair,—while the opposite faces, as $f^5$ (or, $f^{5b}$ in the said Figs. 13ª, 14ª), operate for preventing an irregularity of movement because of any tendency to throw the wheels forwardly too rapidly, thereby regulating the rotary movements of the wheel and pinion with precision. Thus the actual driving of the wheel B by the pinion P only involves the said rearwardly-acting driving-faces of the wheel B (which I designate as "action-faces") and the forwardly-acting or driving-pressure faces of the pinion P.

To simplify the description and, also the statement of the combination claimed, the wheel-tooth working-surfaces are herein usually referred to without particular mention of or reference to the areas,—respectively above and below the pitch-line 7,—which constitute the "face" proper, and the "flank" of the working-surface, as illustrated in many of the figures of the drawings. For instance, as shown in Fig. 4ª each tooth-face, as $f^3$, is shown extending on the line 3 above and also below the pitch-line 7, which thus divides that working-surface into the "face" portion, or zone, lying between the lines 7 and 8, and the "flank" portion or zone lying below said pitch-line 7. Since these two zones,—the "face" and the "flank",—are herein shown and described as located,—in any one tooth-surface,—in one continuing plane, they may as regards some features be considered as a single mechanical element or component of the wheel, but as regards other features, they are separate tooth-face components, especially as related to the path-of-action, since the "face" zone is only effective within the arc-of-approach (before reaching the instant-axis) while the "flank" is effective during the passage thereof through the arc-of-recess, after passing the instant axis.

Since the lower part of the tooth-space is needed for "clearance" to allow the passage of the point of the pinion-tooth,—as customary in the ordinary kinds of "face-and-flank" toothed-gearing,—therefore only a part of the width of the flank-zone, (when made as shown in Figs. 4, 4ª and 19, for instance) will be actually used as a working surface, so that, in practice, the width of the face-zone relatively to the width of such working-portion of the flank-zone, may ordinarily be fixed at a ratio of about one to two,—this being about the ratio herein illustrated. This construction has the advantage of providing a relatively long arc-of-approach during which to first accomplish the "progressive meshing" (hereinafter more fully defined and described) and then secure in each pair of the contacting driving faces, an effective kind and large measure of driving action while the line-of-contact is still outside of the geometric pitch-surface and before it reaches the instant axis. This construction, by reason of the special operational features here referred to, also provides for such an extended path-of-action as to secure the proper co-action with the driving tooth-surfaces of a plurality of the opposing, or re-action, tooth-surfaces, as hereinafter more fully explained.

My present invention contemplates a system of bevel-gear construction in which all the wheels of a given pitch, and of whatever size of pitch-circle, may have acted-on or driving-faces located on any given skew-circle relatively to the wheel axis, and located all in one angular or skew-relation to the cone-angle of the wheel, whatever may be the size or cone-angle of the wheel in any given instance, (within the described range of wheel proportions.) And, similarly in any such wheel, the reaction faces, as $f^{5b}$ (or $f^5$, Fig. 13) of the teeth may all have the same skew-angle, which may be equal to the action-face skew-circle and skew-angle. The aforesaid directly-coacting faces being arranged in converging pairs, and these pairs, as $f^3$, $f^5$, Figs. 13, 14, and $f^{3b}$, $f^{5b}$, Figs. 13$^a$, 14$^a$, being alike except as to the direction of the convergence, each such pair of the converging faces are located or produced in accordance with a geometric feature which I designate as the "master form". As shown in Figs. 13$^a$, 14$^a$, said master-form planes as reproduced in the faces, $f^{3b}$, $f^{5b}$, are outwardly-converging, whereas in Figs. 13 and 14 (as in Figs. 1 to 4), similar faces $f^3$, $f^5$, have an inward convergence. For convenience, the said pairs of wheel tooth-faces—as $f^3$ and $f^5$,—are herein considered, in a mechanical sense, as being tooth-form faces, since they coincide with the geometric tooth-form as reproduced by a single movement (and without rotation) along and parallel to a straight line path, as for instance, parallel to the axial line $x$—see Figs. 1, 2, 3, 22. This mode of reproducing the geometric tooth-form in the plane-surface wheel-tooth faces, I designate as "single-reproduction"; and these faces when so produced I designate, in and for the purposes of this application, as "parallel", "in parallelism" or "longitudinally-parallel", or as having "longitudinal parallelism", since these said faces when so reproduced have surface-element lines parallel to the said straight-line path of movement, and also have these lines in a geometric plane.

In Figs. 13$^a$, 14$^a$, (also see Figs. 24, 25), the master-form is shown applied to the wheel-tooth, which thus has the longitudinally parallel faces. In the other said figures the master-form is shown applied to the tooth-spaces, as F, while the master-face planes,—as $f^3$, $f^5$,— are shown offset in parallel from the tooth-form axis, $x$.

In each of the described arrangements of the convergence of the wheel tooth-surface planes,—as indicated for instance in Figs. 14 and 14$^a$, respectively,—these wheel-tooth faces, (in any series of the tooth-faces having the longitudinally parallel construction), are so arranged and related that,—as shown in Fig. 12$^a$,—in any group of three successive tooth-faces, two of these are arranged in longitudinal parallelism with each other, and since in practice at least three successive wheel-tooth faces will be in mesh to the extent of having a working engagement, therefore at all times in such a set of three successive faces there is a direct parallel (directly opposite) action and re-action, respectively, upon a pair of longitudinally-parallel faces which are one of them next succeeding to the other of them in the circumferential tooth-zone N of the wheel. This peculiar relationship and mode of co-action, is indicated in Figs. 15, 16, and other views, and particularly in said Fig. 12$^a$, where the two inwardly-converging successive faces 21 and 22 are in parallel, while the next successive face, 23, is at an angle, as $l^2$, thereto. Also in said Fig. 12$^a$, another set of three successive faces comprises the two outwardly-converging longitudinal non-parallel faces 23, 23, and the next succeeding parallelly-disposed face 24. In each of these two, the directly opposite action and co-action is indicated by the longitudinal parallelism of the two oppositely-acting faces, as 21, 22, in the one set, and 23, 24 in the other set. In this form of the wheel, (as B, Figs. 1 and 2) the action-face (as $f^3$, Fig. 13; and 22, Fig. 12$^a$) is located between and oppositely inclined to, a pair of re-action faces, as 21 and 23, Fig. 12$^a$, of which one, as 21, is longitudinally parallel to that action-face, while the other said re-action face, as 23, is inclined to said action-face 22 and also to said reaction-face 21. Thus the one action-face, as 22, coacts with two re-action faces,—of which one is longitudinally-parallel and the other longitudinally non-parallel therewith, so arranged that the progressive-meshing of the two reaction faces is different in the one than in the other (see Figs. 15 to 18), while at any one moment the direction of the one reaction is oblique to the direction of the other reaction; and relatively to the action-force itself, the one reaction is parallel to the action-force while the other said reaction is oblique or inclined to such action-force,—so that at all times during any considerable meshing arc, the action-force on each action-face is accomplished by a plurality of reaction forces of which one is divergent from another, and of which one is parallel to the said action-force.

When the master-form, as F, is located (see Figs. 1, 2, 15) with its central line or axis $x$, in a plane radial to the wheel-axis $x^3$, and when at the same time the pair of tooth-faces, as $f^3$, $f^5$, outwardly from the inner-circle 6 are longitudinally-converging relatively to the radii $l^3$ and $l^4$, respectively, as shown in Fig. 15, then the action face $f^3$ has a rearward deflection or skew-angle $l^5$, and the re-action face $f^5$ has a forward deflection or skew-angle $l^6$. In practice (and except in "skew-gearing") these forward and rearward tooth-face skew-angles are preferably equal and of such amplitude as to bring the tooth-face surface-elements into parallelism, since this construction and arrangement greatly facilitates the economical manufacture and also the maintenance of the wheel teeth, in the manner and for the reasons elsewhere herein more fully set forth.

In the class of bevel-gearing, and within the relative ranges, to which my present improvements are more especially applicable, the pinion is almost universally employed as the driving member of the pair, while the larger gear, or wheel proper, is the driven member of the pair, and accordingly it is an especial object of my invention to furnish such bevel-gearing in which,—contrary to the practice heretofore,—the pressure-angle of the driving pinion teeth against the teeth of the driven wheel, may be a constant angle regardless of the cone-angle of the wheel and also regardless of the particular kind of pinion, within the range developable from such wheel teeth. This feature is illustrated by Figs. 13 and 13$^a$, in which the arrow $r^2$, showing the direction of that constant angle of the driving pressure against the flat tooth-face $f^3$, is located normal (vertically) to said face, thus giving a maximum steadiness of rotation to the driven wheel and to any mechanism operatively connected therewith.

In the usual forms of bevel-gear teeth, as shaped by the well known "evolution" method,—and generally accepted as the standard type for use in gears having the teeth thereof formed by a metal-working operation,—there is some proportionate dimension or ratio which applies as between the transverse tooth-section at the outer and larger end of the tooth and the outer pitch-circle; and which also applies as between the tooth-section at the inner end of the tooth and the inner pitch circle, since in such gearing all the tooth-face surface-element lines extend to one point of origin, which in general practice (except in skew-bevels) is the point of axes-intersection. That uniformity of ratio as between the transverse tooth-section at any point in the length of the tapering tooth, and the corresponding pitch-cone circle, is radically departed from in the pair of bevel-gears herein illustrated. In these gears, one of the wheels has a tooth-section of uniform character and of a variable section-and-circle ratio, while in the mating wheel the teeth have both a variable tooth-section and a variable said ratio as between such tooth-sections at successive points along the length of the teeth, and the corresponding pitch-cone circles. Furthermore, these ratios are variable in opposite directions, respectively, in the wheel and in the pinion. When the wheel (as in Fig. 14$^a$) has the uniform-section teeth, the said section-and-circle ratio is such that the tooth-section is relatively smallest at their outer ends at the outer circle, and is relatively largest at their inner ends, at the inner circle; but, contrary to those relative ratios, the teeth of the mating pinion P will then have their tooth-section relatively largest at their outer ends, and relatively smallest at their inner ends, at the inner and smaller circle. Thus the said section-and-circle ratios in the wheel and pinion, respectively, are variable in opposite directions along the length of the teeth.

By the term transverse as herein used for designating the convergence of the two faces comprised in a pair of longitudinally parallel tooth-faces I refer to that direction which is transverse to the lengthwise dimension of the tooth. For instance, in Figs. 1, 2 and 14, the lines 3 are located transverse of the tooth-faces, $f^3$, the length of which extends from the inner tooth-circle 6 to the outer circle 8. Also in these figures, the convergence of the two tooth-faces $f^3$ and $f^5$ is shown of the "inwardly converging" arrangement, since those surfaces if continued below the base of the teeth will meet, as at $t^5$, below the space F, or within the space inclosed by conical pitch-surface of the wheel. In Fig. 14$^a$, the tooth-face transverse convergence is outwardly, since the faces $f^{3b}$ and $f^{5b}$, when continued upwardly, will meet at the line $t^5$, this line being now located externally of the conical pitch surface of the wheel.

In establishing the proportions and location of the master-form for any given master-wheel, we may proceed as follows: With any sphere-axis, as $x^3$, Figs. 1 and 2, fix the sphere-center at $c$ and lay off the required sphere-radius, as $x$, at the angle required for the normal instant-axis, and develop the geometric wheel-inclosing sphere, D, concentric to said center $c$, and with the said axis $x$, as the radius. Through the axis-point $x$, on the surface of the geometric sphere, lay off the two "great-circles" 2 and 4, intersecting at said axis-point $x$, and making the angle, (as $l^7$, Fig. 14) required for the selected or proposed master-form. From the axis-point $x$ now lay off the normals $l^8$, $l^9$, Fig. 19, of the length required for the normals from the tooth-faces to the said instant-axis $x$, and next draw the "small-circles" 3 and 5 parallel to said great-circles 2 and 4, respectively, and at the distance from these great-circles indicated by said normals $l^8$, $l^9$. Then will the plane-surfaces of the required tooth-faces lie in the planes of said off-set and parallel circles 3 and 5; and also all the parallel surface-elements of said tooth surfaces will be arranged in parallel with the said instant-axis $x$, of the geometric wheel structure. The foregoing geometrical construction being developed, the wheel structure itself may then be readily drawn, the tooth-profile outlines, as F, being repeated around the sphere, as many times as the pitch may require.

In the said offset planes, the areas of the wheel-tooth-faces,—as to the lines (surface elements) thereof in parallel with the axis $x$,—are, when taken together, non-radial relatively to the wheel axis, even when said axis is located in a plane which is radial to the wheel axis. This feature will be evident from a comparison of Figs. 1 to 4, in which the axis $x$ is located in a plane radial to the wheel-axis $x^3$. And owing to the convergent positions, as already explained, of the tooth-face planes, it will also now be evident that in any case, and whatever may be the skew-angle of the form-axis $x$, only one such surface-element of any one pair of such face-planes can be radial to the wheel-axis $x^3$; and, hence, as already indicated, all of those convergent plane-surface tooth-faces always have a skew-relation to each other and to any plane of the wheel-axis, and also have a corresponding skew-action or operational relation to the instant-axis of each of the geometric pitch-surfaces of the pair of gears.

For more clearly illustrating the feature of the "master form" as herein employed, and especially in connection with the feature of skew relations, a master form cone is indicated at $t$ in Figs. 7, 9, 10, $10^a$ and $12^a$. The direction of this cone corresponds with the convergence of the two faces (as $f^3$ and $f^5$) of each duplicate outline-form, whether these faces converge outwardly, as in the case of longitudinally parallel teeth, (Figs. $13^a$, $14^a$), or converge inwardly, as in the case of the further improved and preferred construction having longitudinally parallel spaces. In Figs. 9, 10 and $10^a$, the tooth-form cone $t$ is shown with its axis located to one side of the wheel-center $c$ by the distance $l^{10}$ which may be varied to give the desired amount of skew in any given case.

In Figs. 9 and 10 the skew-angle $l^{12}$ is shown at the right-hand of the line R, representing an axial-plane of the wheel axis, while the pinion-axis skew-angle $e^8$ is on the left-hand of said plane, this being a preferred organization for the reason among others that (when the pinion is the driver) the pressure against the wheel-teeth faces tends to counteract the usual tendency of a bevel pinion to crowd outwardly from the wheel axis.

When the axis of the form cone $t$, as in Fig. $12^a$, coincides with the wheel axis at $c$, the circle $t^1$ of said form-cone is the skew-circle to which are tangentially directed the upper lines, as $l^{14}$ and $l^{15}$, of the respective tooth faces, $f^3$, $f^5$, and, similarly, the smaller circle $t^3$ of said cone $t$ is then the skew-circle to which are directed the lower lines, $l^{16}$, $l^{17}$, of said tooth-form faces. Thus the faces of the wheel teeth (as also illustrated in Fig. 15) are "skew-located" even when the master form-axis has its own skew-angle reduced substantially to zero.

When the pinion-axis skew-angle, as $e^8$, Fig. 10, is greater than the pitch-angle $e^9$ of the wheel,—especially when the pinion, as $P^4$, is of plus-normal size, and has its cone-face longer than the wheel-cone face,—and when the skew advance of the wheel-teeth outwardly is toward the approaching teeth of the wheel, (as indicated in Fig. 10) the angular width of the zone of progressive-meshing as regards any single tooth is normally largely increased, (see Figs. 15 and 16) with the result of bringing the initial tooth-mesh earlier, and reducing the rate of outward movement of the path of the contacting point of the engaging surfaces, this path being normally a nearly straight line. Thus by means of the present improvements, I furnish a pair of gears in which both the wheel and pinion are conical, and which are skew-bevels in arrangement and mode of action, and in which, nevertheless, the wheel,—as to the center lines of its teeth,—may be of non-skew and conical construction, thereby securing a superior mode and quality of action combined with the simplest and most advantageous forms and characteristics as to the practical use and manufacture thereof; and with the additional feature that such wheel of the skew-bevel pair is also a master-wheel which is equally operable with non-skew pinions, and with these of the various kinds and arrangements as elsewhere herein more fully explained.

In ordinary practice, nearly all pairs of bevel gears may be properly regarded as skew-bevels, since the wheel-axis and pinion-axis seldom meet exactly, and in nearly all instances there is also, geometrically, an actual skew-circle, having a small but material diameter. In view of these circumstances, I use the term "radial" as applied to the relation of pinion-axis to the wheel-axis, for indicating a case in which the axial skew is reduced, not necessarily nearly to an absolute zero, but merely to some comparatively small proportion of the pitch-arc, as for instance from one to ten per cent. thereof. The skew arrangement of bevel-gears may therefore be regarded as the usual one, and also as the general arrangement or class within which the said radial arrangement of pinion axis is only a particular case. And this view applies also, and for similar reasons, to the location of the master-form axes on or relatively to the wheel and pinion cones as regards the size and location of such a geometric skew-circle.

In a pair of bevel-gears the pinion axis, as $x^7$, Figs. 9 to 10$^a$, may be considered as being always located tangential to a circle, $c^7$, concentric with the wheel axis $x^3$. When said tangential or skew-circle, $c^7$, has a substantial diameter, the gears are then skew-bevels, the extent of the skew, or axial divergence being the skew-angle $e^8$, Fig. 10; and when said skew-circle $c^7$ is reduced to zero, the bevel-wheels become non-skew, (see Figs. 3 and 4) since the axis of the wheel and the axis of the pinion will then lie both in one and the same plane. In this system of bevel-gearing, however, in a pair of "skew-bevels", in some cases only the pinion may have the skewed construction, while the master-wheel remains of the same conical form as provided for use with the non-skew pinions, thus securing an important advantage not heretofore, so far as I am aware, obtainable in skew-bevel gearing. Thus, in this system, all of the pinions may be considered as belonging to one class, the skew-bevel kind, the extent of the skew-angle or axial divergence being reducible to any required amount, with zero as the limit of such reduction.

In the arrangement or relative locations, of wheel-axis and pinion-axis in Figs. 3 and 4, in which these axes are not shown with any substantial amount of axial skew, and also in the arrangement shown in Figs. 8 to 10$^a$, in which said axes have a relatively large amount of axial skew, there is one feature or relation which is the same in both cases, viz:—the direction of the wheel-axis, as located in a plane which is parallel to the pinion-axis, is transverse to the direction of the pinion-axis as located in a plane which is parallel to the wheel-axis, and this constancy of directional relation obtains when the two axes are in one plane, and also when each is in a different plane of a pair of parallel planes. In the figures here mentioned the said transverse directions (see Figs. 3 and 8) are indicated as being substantially at right-angles, the one relatively to the other. And, as will now be evident, the said transverse relation of the two axial directions will be unchanged by a variation of the amount of the axial skew. In, and for the purposes of, this description and claims in this application, when an axis is located in a given plane, such axis and plane are regarded as being parallel, the one to the other.

It is generally well known to practical mechanics that the usual hyperboloidal forms of skew-bevel gears, while theoretically sufficiently correct, cannot in practice be successfully produced within a cost limit which does not make their use, to any considerable extent, commercially impossible.

An important object, therefore, for my present improvements is to furnish gear-wheels adapted for the most accurate and economical manufacture, and also having such a construction that the larger wheel of any given pair shall be equally well adapted for use in skew bevel-gearing and also in bevel-gearing in which the skew-angle of the pinion-axis is reduced substantially to zero.

As a means for attaining the foregoing objects and advantages, the said larger wheel, as B, Fig. 3, for a pair of these bevel wheels, is provided with teeth which have their working-faces in the form of the transversely-converging planes, and these are arranged in pairs which are longitudinally parallel, so that in any such pair of tooth-faces their normal operation involves a skew-action as between these plane-surface tooth-faces and the faces of a co-meshing pinion, even when the skew-angle of the "master-form", (or of its axis $x$, Figs. 1 and 2), and also the skew-angle of the pinion-axis are each reduced substantially to zero, thereby bringing the pinion-axis, as $x^6$, to intersect the wheel-axis, as $x^3$, Fig. 3, and bringing the location of the center lines of the teeth and tooth-spaces of both the wheel and the pinion into substantial coincidence with axial planes that are radial to the wheel-axis, and pinion-axis, respectively. In this gearing, therefore, there is a certain skew-action of the tooth-faces which is normal to the operation,—together with a relatively progressive meshing (see Figs. 15–18), longitudinally of the teeth during the approach into full-mesh,—so that the increasing of the said skew angles or either of them from zero to within any practicable limits, does not, in effect, create a different kind of co-action, but merely varies in a quantative manner the same kind of co-action which occurs when the gears have the actual skew-angles reduced substantially to zero. Thus a skew-action involving a longitudinally-progressive meshing, as between the plane-surface wheel-teeth and the coacting curved-surface pinion teeth is obtained even when the "master-forms" are located radially to the wheel axis, and with pinions of different sizes and having respectively, different skew locations of the pinion-axis relatively to the wheel-axis. During this progressive meshing of the coacting teeth, which proceeds after the manner comparatively illustrated in Figs. 17 and 18, in connection with Figs. 16$^a$ and 16$^b$, the initial meshing or tooth-engagement will usually begin at the inner tooth-circle 6 where the tooth has the lowest velocity and thence proceed outwardly along the tooth to the outer circle 8, where the teeth have the greatest velocity; and during this period the tooth, as $h$, of the wheel B advances circumferentially through somewhat less than one-half of the arc $k$, Fig. 16.

A further feature of practical importance results from the lesser angle subtended by the outer end of the master-form as compared with the angle subtended by the inner end thereof, in that the period is increased within which the best character of direct coaction, within the arc of approach of the tooth-faces is maintained at the outer end of the tooth-faces, as compared with the period and duration of the progressive meshing at the inner end of the next following pinion tooth. This advantage will now be evident from a comparison of Figs. 13, 13$^a$, where the driving action, at $r^2$, on the faces at $f^3$ is kept from reaction by the nearby reaction-faces at $f^5$, this control being prolonged until the inner ends of the next following pairs of faces are well advanced toward their full mesh position. These advantages are thus related to the circumstance that in this gearing the tooth-faces have a height, and the longitudinally-parallel pairs thereof have a width, which subtends decreasing angles from the inner tooth-zone circle, 6, (Fig. 15) outwardly to the outer circle 8 of this zone. By reason of the said skew-location or circumferential advance of one end of each tooth-face relatively to the other end thereof, the boundary line, as 30, of the meshing zone $k$ (at the left hand of said zone in Fig. 16) is varied in location either to reduce or increase this zone to some extent from what said zone-width $k$ would otherwise be; but as the said driving or pressure-face, as $f^3$, approaches the location usually designated as the "instant-axis", the skew-location of said pressure-face causes the two wheels to operate somewhat after the manner of gears having spiral teeth, and this result is accomplished even while the location of the body of the tooth, as to its center or axial line, as $l$, Fig. 13, is in a plane radial to the axis of the wheel. On the forward side of the tooth wheel $h^1$, Fig. 15, the reaction face $f^5$ operates, of course, in a reversed order or direction relatively to said action face $f^3$, not only as to the approach of the coacting-face of a pinion tooth as at $e^1$, Fig. 16, but also as to the recession or drawing apart of said coacting faces, as at $e^2$, Fig. 16. When the tooth-face-planes are outwardly-converging, as in Fig. 4$^b$, the rearward face, $f^{3b}$, of the pair of tooth-faces is, of course, the driving or pressure-face, while the forward face $f^{5b}$ acts as a direct reaction face therefor; but when the tooth-face-planes are inwardly-converging, as in Figs. 4$^a$, 15 and 15$^a$, the forward face $f^3$ is the driving face while the rearward face $f^5$ is the direct reaction face therefor. Thus, circumferentially of the wheel, the order of succession of these directly coacting driving and reaction faces is reversed in the two arrangements, respectively, of the transverse convergence also, the skew-angles of the said two faces will be similarly reversed, as will be evident from Fig. 15.

One feature of the skew-action of the plane-surface tooth-faces, relates to the increased duration of the meshing period or zone which is obtained by arranging the tooth-surface skew reversely to the axial skew of the pinion and relatively to the direction of rotation. For instance, as shown in Fig. 10, if the axial-skew of pinion-axis $x^7$ is assumed to be forwardly (that is swung in the direction of wheel rotation as there shown (then the skew of the form axis, $x^2$, is rearwardly. And this same relation I regard as still subsisting when the skew-angle of the form-axis (as shown by the angle $e^7$, Fig. 10) is a substantial amount, even when the said pinion-axis skew is reduced nearly or quite to zero, (as in Fig. 3) since in all such non-similar relations of the two skew-angles one result is to modify the meshing-zone arc, as $k$, Fig. 16, relatively to what this zone and arc would be in arrangements where the said skew angles are not so reversely located, as shown for instance by $F^4$ in Figs. 5, 6 and 7. By thus varying the skew-arrangement of pinion axis and master-form axes, the duration of the progressive meshing period or zone, can be regulated to suit a wide range of requirements, while retaining the plane-surface character and the longitudinally parallel location of the tooth faces of the wheel. With these skew-located or non-radial tooth-faces as arranged in pairs and in parallel with the master-form axis, another peculiar feature of the described progressive-meshing is illustrated in the diagrammatic views, Figs. 15 and 15$^a$, and relates to a variation in the rate of the co-meshing action outwardly across the tooth-zone N of the wheel, as between the upper part and the lower part of the tooth-faces. This is indicated in said figures in connection with the radial lines showing the different circumferential arcs as measured on the circles, as measured, for instance on the circumference line 8, at the inner and outer ends respectively of the same pair of tooth-faces.

In the diagram, Fig. 15, the radial dotted lines 40 and 42, show the arc which is occupied (subtended) on the inner circle 6, by the inner end, or inclined profile-line, of the plane-surface $f^5$ of the tooth $h^1$. Similarly, the radial dotted lines 41 and 43 show the relatively much smaller arc which is occupied on the outer circle 8 by the outer end, or profile, of said tooth-face $f^5$. The said radial lines 42 and 43 include between them the arc (or angle), $e^4$ which represents the amount of the angular advance—circumferentially of the zone N,—of the lower line, or base-line $l^{17}$ of said face $f^5$, from its inner end on circle 6 and passing outwardly to its outer end on circle 8. In like manner, the lines 40 and 41, on being compared, show the arc (or angle), $e^3$, which represents the amount of the angular advance of the upper line, $l^{15}$, of said tooth-face $f^5$ in passing from said circle 6 outwardly to said circle 8; and from a comparison of the angles subtended by said arcs $e^3$ and $e^4$, respectively, it will be seen that the said angular advance of the said upper face-line $l^{15}$ is very much greater than that of the said lower face-line $l^{17}$. On the opposite tooth-face $f^3$, the lower line $l^{16}$ has the small angle $e^{14}$ between the lines 52, 53, and the upper line $l^{14}$ has the greater angle $e^{13}$ between the lines 50, 51, while the angles 5 and 15 show the similar but reversed circumferential arcs which include the two oppositely inclined faces $f^5$ and $f^3$, respectively. Thus the initial meshing occurs not only progressively, longitudinally and outwardly along the wheel-teeth, but takes place upon plane-surface skew-action tooth-faces, the surface elements of which have, respectively, an increasing circumferential advance from the lower tooth-face line upwardly to the top line thereof, thereby favoring the development in the operation of the gears of exceptionally smooth running qualities.

When the tooth-face skew-angles, or opposite tangential deflections, are together equal to the radii-angles, $l^5$ and $l^6$, Fig. 15, then, of course, the tooth-lines $l^{14}$, $l^{15}$ and $l^{16}$, $l^{17}$ will be parallel; and this principle also applies to each point along the height of the tooth-face. These relations are further shown in the supplemental view, Fig. 15$^a$, for making clear by comparison with said Figs. 15 and 16 how the skew-angle of the tooth-face elements,—in this preferred construction,—progressively increases from the lower tooth-line or element, upwardly to the upper said element. The relatively small angular advance of the lower tooth-face line $l^{17}$, from the inner circle 6 to the circle 8 (Fig. 15) is shown in Fig. 15$^a$ by the amount of the inclination of the line $l^{18}$ in the height of the tooth-face $f^5$, this amount corresponding to the arc $e^4$, Fig. 15. Similarly, the larger angular advance of the upper tooth-face line $l^{15}$ is indicated by the amount of the inclination of the line $l^{19}$ in the height of the tooth-face, $f^5$ (from point $l^{17}$ to point $l^{15}$, Fig. 15$^a$), this amount corresponding to the arc $e^3$. The said diagrammatic lines $l^{18}$ and $l^{19}$, are therefore drawn on Fig. 15$^a$ for convenience in contrasting and comparing the described angular and circumferential advance of said lines $l^{15}$ and $l^{17}$, with the similar angular advance which the profile line of the said tooth-face has at the circle 8, at the outer end of the tooth-face $f^5$.

When the pitch-cone line $x^5$ of the pinion,—see Figs. 8 and 20,—is inclined to and intersects the wheel-cone line this locates said pitch-cone line diagonally across the said plane-surface faces $f^3$ and $f^5$ of the wheel-tooth, $h$; then in the assembled wheels the depth of engagement of the pinion teeth with said plane-surfaces of the wheel-teeth outside of the pinion pitch-cone will be greatest at the inner ends, as at $e^{16}$, and decreases toward the outer ends, as at $e^{17}$, of the teeth, for thereby modulating or conforming the coaction of the tooth-surface elements to those normal limits, as $e^{16}$ and $e^{17}$, of the zones of interference at the inner and outer tooth-circles, 6 and 8, respectively.

In Fig. 5 the skew-circle $t^6$ is shown located in the normal pitch-cone of the wheel $B^1$ so that all the form axes, as $x^4$, extend to said skew-circle $t^6$. In some cases, however, the skew circle may be located above, (elevated from) or may be located below, (depressed from) such normal location. These variations in the height of the location of the actual skew-circle, relatively to the center (as $c$, Fig. 6) of the wheel-including sphere D, are preferably restricted, in practice, to a moderate proportion of the radius of the normal-skew-circle; and the position of the actual skew-circle above or below the normal skew-circle may be arranged, in any particular case, in such a manner as to bring the said form-axis more nearly into alinement with the actual "instant-axis" of some co-meshing pinion of non-normal proportions relatively to the wheel-cone. These various features I have particularly indicated in Fig. 6 where several skew-circles are shown on a skew-sphere, $d$, which has its center at $c$, coincident with the center of the wheel-including sphere D. In the surface of said skew-circle sphere, the circle $t^6$ is designated as the normal one, because it is located in the normal pitch-cone, this being the geometric cone whose apex is at the center $c$ of the wheel-including sphere D, and whose outer circle, at 7, is the circle in which lie the axial-centers, as $x$, $x^4$, etc. A slightly larger skew-circle $t^4$ located on said small geometric sphere $d$ is elevated above said normal skew-circle, and one of the pairs of tooth-surfaces $F^5$, is shown having its axis directed to this elevated skew-circle. A smaller skew-circle $t^8$ is shown located on the skew-sphere $d$, in a depressed position, below said normal skew-circle and (similarly as before) one of the pairs of tooth-surfaces $F^3$, is shown having its axis directed tangentially to this depressed skew-circle. In this manner, especially when the co-meshing pinion is required to be of an extreme non-normal proportion, the range of applicability of this system of bevel-gearing, may be somewhat extended as regards its use in exceptional cases. When the form axis, as $x$, in Fig. 6, extends to the sphere center $c$, then the skew-sphere is regarded as having been reduced substantially to zero, but not extinguished. In a pair of these gears, when the wheel has each longitudinally-parallel pair of tooth-faces with its center-line, as $x$, Fig. 3, in a plane radial to the wheel axis, the two tooth-face planes, as $f^3$ and $f^5$ (see Fig. 15) have a skew-angle relation to said wheel-axis, one of them, as $f^5$, having a forward skew while the other said face, as $f^3$, has a rearward skew; similarly the pinion P has its tooth-faces arranged with their bounding planes (these coinciding with the wheel-tooth profile),—and hence their surface elements in general,—located on similar skew-angles, and these in relatively the same order of arrangement, as indicated for instance, in Figs. 4, 9 and 10. When the action-face, as $f^3$, of the wheel has a rearward skew, (see Fig. 15) the amount of which is indicated by the angle $e^{13}$, the coacting pinion tooth-face will have a corresponding amount of skew in the said direction. In this pinion construction, therefore, the master-form (from or according to which the warped faces of the pinion teeth are to be generated) has the two side-planes in longitudinal parallelism, in this respect corresponding with the wheel construction. But when the wheel has the inwardly-converging longitudinally parallel planes, (and therefore has the longitudinally parallel spaces, as F) the pinion master-form has,—relatively to the pinion-cone,—the outwardly-converging arrangement of the said longitudinally parallel planes, which are the "form" planes or bounding-planes of the curved-surface tooth-faces. In this improved form of the gearing, therefore, and as particularly indicated in Figs. 15, 15ᵃ and 19, there will be some one plane in which the sectional outline of the pinion tooth is a parallelogram, and this intersecting parallelogram or plane, may be said to be the same as, or geometrically to coincide with, the similar plane of the wheel master-form, so that these two planes may be said to come into the same positions and geometrically coincide when the two engaging master-forms also come into coincidence in the same plane, and in the exact full-mesh position, this being also illustrated at $x$, Fig. 4.

By reason of the sameness of organization as set forth of the master-forms of both wheel and pinion, and the reversal of the relative direction of the convergence in the wheel and pinion, respectively, of a directly-coacting pair of these master-forms, (see Figs. 21, 23) when the counterpart tool (as T, Fig. 23) is employed for generating the pinion curved-surface tooth-faces, by the described compound-reproduction, it follows that this operation being begun at any one point, may then continue without change until the entire length of the tooth is completely shaped, and with the result of forming the opposite tooth-faces of a transversely curved shape which has a constantly decreasing curvature along the length of the pinion tooth from the inner end toward the outer end thereof, and thereby producing on a conical pinion, a tooth characterized by the feature of having the opposite working-surface primary elements (as indicated, for instance at $i$ and $i'$, Fig. 19) in parallelism. In the pinion P⁴, Figs. 9, 10, the skewed teeth, $g^4$ are shown of that form.

An immediate and important practical result of this system of parallel-construction as applied to both the pinion-teeth and wheel tooth-space from identical master-form profiles (in addition to the great advantage and economy,—as already explained, of eliminating the compound-reproduction otherwise required for making the wheel teeth,) is the complete elimination of the difficult setting and gaging operations which are necessary in the manufacture of conical gears having longitudinally-tapering teeth on both wheel and pinion. Also in this parallel-construction, the pinion tooth may be completely shaped and sized without the danger of a variation in width of the tooth being caused by any inaccuracy of the indexing of the wheel blanks, when the teeth are made by cutting operations; thus I avoid one of the causes of imperfection appertaining to the manufacture of conical gearing in gear-tooth-generating machines, since hitherto, so far as I am aware, in such machines a single tool may operate only on one side of a tooth, whereas in this system, the master-form counterpart tool may operate on both sides at the same time.

Fig. 16ᵃ illustrates the relation on the inner circle 6, of the pinion tooth, $g$, and a co-meshing wheel-tooth, $h$, when the tooth $g$ is about to enter the meshing zone $k$. In Fig. 16ᵇ the same relation of the teeth $g$ and $h$ is shown as occurring on the outer circle 8. When the inner end of the tooth comes to the line 6, as in Fig. 16ᵃ, the outer end is normally, (in gears of low skew angles) about in the position $g$, Fig. 16ᵇ. This rotative difference is approximately indicated by the arc $e'$ in Fig. 16, and by the dotted-line tooth-portion, $g'$, in Fig. 16ᵇ. In Fig. 17, a sectional side-view, as seen from the left-hand in Fig. 16ᵃ, illustrates how the two teeth approach at an angle at the line 30, Fig. 16; and Fig. 18 illustrates how the same teeth overlap when arriving at about the line 34 in Fig. 16. On the opposite side of the meshing zone, of course, the teeth draw apart in a reverse order. The lines of the said progressive meshing and un-meshing, are indicated approximately at 34 and 35, respectively.

The features herein set forth as to the said parallelogram longitudinal section of the tooth-form and the straight line contact of the tooth-faces, are further illustrated in the geometrical diagram Fig. 19, which may be explained as follows: In these views,—which show only a symmetrical case, in which the axes meet and coincide with the instant-axes,—the pinion-tooth is located in the central and symmetrical position with reference to the plane of the shaft axes, and the pinion axis is so located as to have the axial skew-angle reduced to zero. In Fig. 19 the solid lines $l^{16}$, $l^{17}$ and $l^{14}$ $l^{15}$ are the projections of the plane-surface tooth-faces of the master-wheel tooth-space, F (as in Fig. 4) looking in the direction of the common element or line of tangency of the two pitch cones, said common element being projected in the point $x$. Arcs of pitch circles of the master-wheel pitch-cone, at successive points in the tooth-zone N (drawn through different points in the line $x$) will be projected as the several arcs 7, $7^a$, $7^b$. But all normals through points of contact must pass through point $x$ which is the "instant-center" (projection of the "instant-axis") for the relative motion of the pitch cones. The contact-normals,—referring now to the left-hand side of Fig. 19,—will therefore be projected in the direction of line $l^9$, from the bearing line of which point $i$ is a projection, to the form-axis line (which is also the instant-axis in the drawings as here shown) of which the point $x$ is the projection; and, (as indicated on the right hand side of Fig. 19,) all of the contact-normals projected from the bearing-line of which the point $i'$ is the projection will be projected in the direction of the line $l^8$, from the said line at point $i'$ to the same axis-line at $x$. Hence the parallel straight projected lines, of which the points $i$ and $i'$ are projections, are lines of contact, and as such are common to the warped tooth-surface of the pinion and the plane tooth-surfaces of the master gear. The light lines $g^6$ and $g^5$ and $g^3$ indicate approximately the character of the pinion profile at successive points in its length. The figure of a section of the pinion-tooth taken on the lines $i$, $i'$, when these are parallel and the plane (tangential) of the instant-axis, will have straight-line sides, and when the instant-axis is parallel to the axial-line of the single-reproduction, (that is, when these lines coincide, as at $x$, Figs. 1 to 4, 6 and 22) this sectional figure will be a parallelogram. For positions other than the central (symmetrical) position shown in the Fig. 19, the common element of the rolling pitch-cones is a straight line, since the master-wheel tooth-faces are planes, and hence a set of normals from the former to the latter will intersect the latter at points in a straight line. Hence the contact lines are always straight lines. This may be stated as follows: The pinion tooth-surface is the envelop of the lines of contact of the pinion tooth surface with a flat surface; that is, of the plane-surface master-wheel tooth-face; the envelop of a plane is a developable ruled (straight-line-element) surface; and such a surface has tangent contact along a straight line when in contact with a plane.

In those instances in which, in this system of bevel-gearing, the pinion has the length of its cone-face substantially equal to the length of the wheel-cone face, I have herein,—for convenience and to facilitate comparison,—generally designated such pinion as being one of "normal" size or proportions; and, similarly, when such pinion-cone has a face length less than the wheel-cone face, I designate the pinion as being "sub-normal," and when its said pinion cone-face exceeds the wheel-cone face, I designate the pinion as being "plus-normal"; and I include the sub-normal and the plus-normal pinions under the term "non-normal" for broadly distinguishing them from those of normal proportions. A few such relative non-normal proportions are illustrated in Fig. 11, in which the smaller pinion P' is sub-normal while the medium size pinion, P, is normal, and the larger pinions $P^2$ and $P^3$ are plus-normal. The medium pinion P is designated as "normal" because its proportions relatively to the proportions of the mating wheel correspond to the proportions between wheel and pinion which would be necessary in bevel-gear wheels of similar diameters when made according to the heretofore accepted standards; but in my improved bevel-gearing,— contrary to that former practice,—all of the said pinions, although of widely varying sizes and cone-lengths, operate correctly with the same mating wheel, which thus becomes a master-wheel therefor.

In their tooth-face formation, each one of any plurality of the exchangeable pinions, as P, P', $P^2$ and $P^3$, Fig. 11, may have their tooth-face surfaces shaped by the method of compound-reproduction, or "evolution," from and by the counterpart of the same master-wheel form F, by generating the pinion teeth from a rolling movement on the pitch-cones. In this operation in the case of the smaller pinion P', the pitch-cones resulting from the rolling movement will, of course, meet on the axial line at $c'$; while in the case of the larger pinions $P^2$ and $P^3$, the rolling movement during the tooth-face generation will be on the cone pitch-surfaces having their apexes at $c^2$ and $c^3$, respectively. In each case, however, the same plane-surface counterpart tool, as T (see Figs. 21 to 23), or a suitable correspondingly-shaped cutter (not shown) in lieu thereof, will properly generate the corresponding pinion-tooth curved-face of a conjugate form or configuration for working correctly upon the plane-surface toothing faces of such master-wheel. Thus one of the conical master-wheels having the plane-surface tooth faces constitutes a master or form for generating the teeth on any plurality of pinions of different sizes, respectively, and each specially shaped for rolling correctly in mesh with that one master wheel; but these different pinions, being each thus specially shaped, are not thereby formed for working in mesh with each other, nor with a differently proportioned master-wheel. In all these instances, however, the pinion tooth-surface may be properly described as having a developed curvature generated "according to" the plane-surface tooth-faces of the mating master-wheel of the pair. These pinion tooth-faces are said to be "generated" because in practice they will be, usually and preferably, produced in and by some suitable gear tooth-generating machine, the tooth-faces being developed from and by a tool whose cutting lines are made "according to" the "form" of the master-wheel teeth,—preferably the form F,—so the resultant or conjugate "tooth-face transverse curvature" will be of the same "developed" formation as if the tooth-faces of the pinion were actually molded into shape by the rolling of the pinion in mesh with its own master-wheel. An improved machine which I have devised for making the pinions in the manner here indicated, will form the subject-matter of a separate application, to be concurrently pending herewith, Serial No. 814,035, filed January 24, 1914 for gear-cutting machine. And the improvements in gearing which, being of invention, are herein described but are not claimed herein, and which are applicable in part to gearing of other forms than herein claimed, are reserved to constitute in part the subject matter of a separate application which I have filed for Letters Patent of the United States, for improvements in gearing, Serial No. 853,017.

By reason of the uniformity of tooth construction on all the wheels of a given tooth-arc or pitch-arc and the adaptability of any wheel of such series to work with pinions having varying sizes, cone-angles, skew-angles and axial angles, it will be evident that the bevel-wheel, as B, when considered by itself has no pitch-line, nor any pitch-cone; and that the pitch-cone in this bevel-gearing may properly be said to be a function of the pinion, and to result entirely from the particular kind of pinion and its relation to the wheel in any given case.

When any such a master-wheel is combined with a mating pinion of a construction developable therefrom, the resultant geometric cones of relative movement, will normally be formed with the surface line of the pinion-cone located near the outer edge of the tooth-faces of the wheel-teeth; this is indicated by line 7 in Fig. 4. In Fig. 3 that pinion cone-of-relative-movement is indicated by the axial line $x$, or "instant-axis" of the cones of relative movement; these geometric cones may be non-coincident with all of the "cones" of the wheel and pinion structure (see Figs. 11 and 20), being resultant from (a fraction of) the operational relations of the pinion as located and combined with the wheel. In practice, any convenient plurality of such pinions, normal or non-normal, or both at once, may be operated in mesh with one and the same master-wheel, provided, of course, that each said pinion so employed shall be located free of the other pinions of any such assemblage or set. This peculiar and comparative universality which I thus obtain as regards the pluralities of pinions and the varying arrangements thereof all equally operable with one and the same mating wheel, becomes greater in its range of practical applications, in proportion to the increase of diameter of the master-wheel, and when the cone-angle thereof is within the described range of the larger-cones, this range being shown in Fig. 12, as between the angles of 45 and 90 degrees from the axis $x^3$.

In the master wheel, the plane-surface tooth-faces (in both arrangements of the transverse convergence), are not only "skew-located" as already explained (Fig. 15), but are also non-radial, since in any case no more than one surface-element line of any said tooth-face,—and not the surface, as such,—can lie in a plane of the wheel-axis; and this arrangement can only exist when the skew-angle of the master-form-axis corresponds with the tooth-space angle, which, in practice may seldom occur.

The arrangements and relations of the several angles as herein explained in connection with Figs. 12$^a$ and 15, have the advantage among others, of permitting the complete formation of the pair of inwardly-converging faces as a precisionized counterpart of the space-forming instrumentality and by single-reproduction only, while entirely eliminating from the tooth-space dimensions, all of the error heretofore commonly occurring in the manufacture of bevel gears, from defective indexing in the usual gear-cutting machines, so that in my present improvement in bevel gearing any such indexing errors are confined to the tooth-arcs, and are thus largely overcome and in a most effective manner, by the peculiar skew-action and the progressive meshing action which I have elsewhere herein more fully set forth, particularly in connection with Figs. 15 to 20.

In the circuit of the tooth-zone N (see Figs. 12ª, 15 and 16) there are two series of the skew-located tooth-faces located respectively, in two different angular positions, on the wheel-cone or relatively to a plane radial to the wheel axis $x^3$. Thus the faces in one series have an angular deviation from the radial plane, in one direction, while the faces of the other series have a different angular position relatively to the corresponding radial axial plane. Each of these plane-surface faces, as 22 or 23, Fig. 12ª, is at the same time, one of a pair which is comprised in a "master-form", and also one of a pair (Figs. 15, 16) which constitute the opposite faces of a tooth as $h$; and each three successive faces in the circuit includes two faces which are comprised in one or the other of those two series, and comprises two faces of the pairs which have the parallel inwardly-converging arrangement. Thus each said plane-surface face becomes a member of two successive pairs of faces, as shown for instance in Fig. 12ª, where the face 22 is the left-hand member of the parallel pair 21 and 22, constituting the inwardly-converging tooth-form F (Fig. 13) and is also the right-hand member of the pair 23 and 22, forming the opposite faces of a tooth. The whole series, therefore, of these plane-surface faces are arranged in alternating pairs, of which the whole number of pairs is equal to the whole number of those faces; each said intermediate pair as 22, 23, having a longitudinal face-angle greater than the angle subtended by the tooth-arc, while the alternate pairs, as 21, 22, and 23, 24, have their longitudinal angle reduced approximately or quite to zero,—that is, substantially to parallelism.

From the foregoing description as herein illustrated, it will be evident how in this bevel-gearing, the conical master-wheel has skew-located face-and-flank plane-surface tooth-faces arranged in two series of transversely-converging pairs in which the adjacent faces of the pairs of one series constitute the pairs of the other series, and in which each face of a pair in one series has an angular advance varying from that of the corresponding face in the pairs of the other series, and has the faces comprising the pairs in one series arranged in the longitudinal parallelism and also with the inward-convergence, while in each set of three successive tooth-faces, there are two adjacent faces comprised in a pair in one said series, and two adjacent tooth-faces comprised in a pair having the inward convergence.

The two described arrangements of the transverse convergence of the wheel-teeth working surfaces, and the coöperation of the pinion therewith, are illustrated by Figs. 4ª and 4ᵇ, by Figs. 13 and 13ª, by the combined Figs. 14 and 14ª, and by all these in comparison with Figs. 21, 22, 23 representing one arrangement, and with Figs. 24, 25, representing the other arrangement. The relation of these arrangements, ("forms of wheel") may be clearly seen by observing in Fig. 16 the succession of features lettered "F" and "$h$", respectively; if we suppose "F" to be a space (corresponding to Figs. 21–23) then the "tooth $h$" is longitudinally tapering, but if we suppose the part "$h$" to be a space (corresponding to Figs. 24, 25), then "F" would be a tooth, and this tooth,—instead of the space would have the kind of parallel construction which is herein designated "longitudinally-parallel," as this term is elsewhere herein more fully defined. Those two constructions as regards the transverse convergence are regarded as broadly included under one definition and hence are herein so described and claimed; but the inwardly-converging construction has,—as already explained,—important advantages, and especially since this form of wheel has,—as compared with the other,—a reversed angular, or circumferential, "advance" of the tooth-face surface-elements of the "driving" (or "action") working-surfaces of the wheel-teeth, and has the peculiar "skew-action" and other special qualities and features of operation as hereinbefore set forth in detail.

In a pair of intermeshing conical gears, and as between the body of a wheel-tooth and the body of a pinion-tooth, the proper rolling movement requires, in any given instance, some aggregate amount of transverse-curvature, or profile deviation, of the one tooth-face relatively to the other, and in the former practice it was customary to apportion that total relative curvature one part to the wheel and the remaining part to the pinion. In this system of conical gearing, and contrary to that former practice, no such apportionment is made, but the whole of such relative curvature or deviation is applied to the pinion-tooth-face, thus leaving the wheel tooth-face without any transverse curvature. This feature combined with a longitudinal parallelism of those non-curved tooth-faces, and with these faces transversely converging, is a means for bringing the two said members of the pair of gears into such a relationship that in addition to having the improved operational features herein set forth, the wheel-teeth can be made by the single-reproduction method, and only the pinion require the compound-reproduction method for its manufacture. This improvement in the method of manufacture, however, is not claimed herein, but is reserved to form in part the subject-matter of a separate application to be concurrently pending herewith.

By employing the inwardly-converging combination of the plane-faces, thereby applying the master form to the spaces of the wheel,—it becomes possible in making the conjugate-curvature of the pinion toothfaces, to employ a double-profile tool, as T, Figs. 21 and 23, for operating on both sides of one pinion-tooth at the same time, so that, in practice, the usual duplicate operations of finishing the cross-sectional curvatures of the pinion-teeth on one face at a time,—as required when these teeth are longitudinally tapering,—are in this system combined together, two such single operations into one duplex operation, which is a "compound-reproduction" and results, as will be evident, in doubling the otherwise normal capacity of the pinion-tooth-forming machine, and, of course, results in a proportionate reduction in this leading item in the cost of manufacture.

As an aid to a full and clear description of the bevel-gearing, I will now briefly explain one method of making the faces of the wheel, and the use of the counterpart tools for making of the conjugationally-curved pinion-tooth faces by the duplicate of the master-form of the wheel with which such pinion is to mesh. In Fig. 21 the ellipse 8 is the outer circle of the wheel B, as seen in the direction shown in Fig. 4, the line of sight being parallel to the axis $x$ of the centrally located tooth-form at F; this view also shows the plane-surface faces arranged inwardly-converging. In Fig. 22, a section is shown of the tooth-rim of the wheel B, as seen from the right-hand in Fig. 21, the tooth-face $f^3$ being shown fully formed, while the form-axis $x$ indicates the line of movement of the tool J, the profile-outline of which (Fig. 21) should correspond with the master-form F, Fig. 13, for the wheel B. The wheel-blank being properly held in a well-known manner in a suitable indexing-shaping maching (not shown), and the tool J being reciprocated while carried in the usual tool-holder of such well-known shaping machine, the tool may then be fed gradually downward to its said position in Figs. 21 and 22, thereby "reproducing" the form of the tool in a reversed arrangement in the wheel rim and with only a "single" direction or kind of movement as between the wheel and the tool, and thus completing one pair of plane-surface, parallel tooth-form faces by the "single-reproduction" method. This operation being repeated around the wheel at each pitch-arc interval, all the tooth-faces will be similarly completed. In said Fig. 21, a counterpart-tool, T, is indicated by dotted lines in a position in which it exactly matches the aforesaid tool J, and is an exact counterpart of the tooth-form F of the wheel. Such a counterpart tool is shown at T, Fig. 23, as employed for making the pinion-tooth $g$ of a conjugate-curvature for correctly operating with the aforesaid tooth-form faces $f^3$ and $f^5$ of the wheel. For this purpose, the tool T will be given a "planer-movement" with a rapid reciprocation in the line of the tooth-form axis $x$ (coinciding with the line of sight in Figs. 4 and 21) and at the same time will be given a slow feed movement in a circle, as 8 (herein seen as an ellipse) coinciding with the pitch-cone of the wheel; that is, the tool T has a compound motion, comprising a repeated reciprocatory or working movement in the line of the "instant-axis" of the pitch-cone of the wheel, while this line of movement slowly revolves about the axis of the wheel. During this compound operation, the pinion blank P also revolves, (as indicated by arrows in Fig. 23) until the tool T has swung from the initial position T' to the final position T'', thereby completing both of the faces of the pinion-tooth by a single operation of the machine, and by a method of "compound-reproduction" whereby the complete "tooth-form" with its plane-surface and parallel construction is reproduced in a conjugational manner in the curved faces of the similarly parallel pinion teeth. Figs. 24 and 25 correspond to said Figs. 21 and 23, respectively with the exception that the tools J and T are changed places, the tool T being shown in Fig. 24 as used for making the wheel-tooth, and with the tooth-faces outwardly-converging, but with the single-reproduction, as before. In the companion view, Fig. 25, the counterpart tool J is shown as used for "generating" the corresponding and oppositely-disposed curved faces of the pinion-teeth, $g$, $g$, with and between which the said wheel-tooth (here represented by J) is to directly co-act. Thus in each arrangement, the two counterpart tools produce four faces arranged in two pairs for direct co-action, and arranged on the lines of master-forms which are identical for both the conical wheel and the conical pinion.

In making the pinions by this method of compound-reproduction, the mechanism (not shown) may be operated to carry the tool,—as T, Fig. 23, or J, Fig. 25,—from one said position to the other, for thereby completing one pair of the conjugate faces, as in Fig. 23 or in Fig. 25; next the pinion will be indexed through one pitch-angle, and the next pair of faces be made by a reverse movement of the rolling members, to carry the tool from the said left hand position to the said right-hand position as in Figs. 23 and 25. An improved machine for making the pinions by this method of compound-reproduction, will constitute the subject-matter of a separate application to be concurrently pending herewith.

In Fig. 26, the pinion P is shown in correspondence with the same member in Fig. 3, except as to the inclined position of the pinion axis, $x^6$, which is here shown inclined for bringing the instant axis, $x$, in alinement with the point $x$, in Fig. 25,—this point being, in Figs. 23 and 25, the projection of the instant-axis. In Figs. 27 to 28$^a$, the dotted lines $i$, $i'$, indicate the primary surface-elements which come to parallelism when the mating wheel and pinion teeth come to a symmetrical position, one instance of which is illustrated in Fig. 19, for the form of tooth shown in Fig. 28$^a$. This is particularly indicated in Fig. 28$^a$ where the parallel lines $i$, $i'$, are the bearing lines of which the points $i$, $i'$, Fig. 19, are projections. The curved character of the working surfaces of the tooth $g$, Fig. 28, is indicated in said Fig. 19, by the lines $g^3$, $g^5$, $g^6$, already described, and is further indicated in Figs. 28, 28$^a$, by the slightly curved bottom and top lies $j^2$ and $j^3$, respectively, but these curvatures are slightly exagerated for making these diagrammatic representations appear more clearly on the drawing. For the tapering form of pinion-tooth, as in Figs. 27, 27$^a$, a corresponding symmetrical position is indicated in Fig. 25, where the wheel-tooth position is indicated by the tool J, located between the two pinion-teeth $g$, $g$.

In the side view Fig. 26, of course the top and bottom lines, $j$, $j'$, appear as straight lines. This Fig. 26, although drawn in projection with Fig. 25, would also be correct if similarly drawn in projection with Fig. 23, since, on the scale here illustrated, such a side view of each form of pinion-tooth will be nearly the same. In Figs. 28 and 28$^a$ the pinion-teeth $g$ are shown having the longitudinally-parallel configuration, in accordance with Figs. 13 and 14; and with Fig. 16, when "F" is assumed to be a wheel tooth-space and "$h$" is a tooth; but in Figs. 27 and 27$^a$, the pinion-teeth, $g$, have the tapering formation in accordance with Figs. 13$^a$, 14$^a$, and with Fig. 16, when "F" is assumed to be a wheel-tooth and "$h$" is a wheel-tooth space.

In connection with the advantage of being able to make by the use of the same counterpart tool, and by single-reproduction only, the teeth of all the wheels, having a given pitch,—as particularly illustrated in Fig. 12 to Fig. 12$^e$ inclusive,—this system, as will now be evident, has the further advantage of making the tooth-spaces of all sizes and varieties of pinions for such wheels by the use of only one form of tool, and this of only one size, operating by the method of compound-reproduction, or generation, now sometimes designated as "evolution". A direct result of those features is that a single pair of the counterpart tools suffice for making all the pairs of bevel-gears (regardless of varying diameters and cone-angles), of a given pitch and size of tooth, thus reducing the cost of tools and of tool gages, and the cost of their maintainence to the very lowest practicable basis.

In my improved bevel-gears, the action-faces are not only of a plane-surface formation, but are so located as to have one circumferential advance which proceeds upwardly from the base line, as $l^{16}$, Fig. 15, (this being on the base-cone of the wheel) and to have combined therewith another circumferential advance which proceeds from one side of the tooth-zone to the other side thereof, (as from the inner circle 6 to the outer circle 8, or vica-versa), and in a direction of plane transverse to such first advance; and both of those circumferential advances are advances of a plane-surface tooth-face which has the surface-element lines thereof in parallel.

In the foregoing description I have set forth the manner in which the wheels and pinions, respectively, may be produced by the processes of the single-reproduction and the compound-reproduction, and may be so made by means of suitable machinery, but it should be understood that in some cases, if desired, these gears may be made by casting them in suitable molds, by the use of gear-patterns previously produced by such machine-methods, or otherwise, and having the tooth-surfaces thereof made of the required configurations. Also, the gears may be first cast as here explained, but with some surplus material on the working surfaces of the teeth, and these afterward reduced to exact size by means of the described mechanical operations.

In the bevel wheels herein described, when the generative tooth faces are here made parallel in width, and also in depth of tooth-face, any small adjustment of the pinion longitudinally of its axis, only slightly modifies the normal rolling contact, or fit, of the pinion tooth-face against the directly coacting wheel tooth-face; this latter face being a constant in both form and size at all points in its length, the gears are capable of a relatively considerable adjustment in the position of one relatively to the other, with a minimum of change in the operative relations of the tooth-faces during the period of their working contact as indicated by the zone $k^2$, Fig. 16. As a result of this feature, and in any small axially shifting movement of the gears, one relatively to the other, each tooth-section of the pinion-tooth always coacts with a mating tooth-section of one and the same shape and size, so that no variation is produced in the tooth-section direct relations, by the shifting of the gears for sliding the tooth of one gear longitudinally of a coacting tooth of the other gear, within the meshing zone. In this manner there is eliminated one of the variable relations heretofore occurring as between the coacting teeth of the respective bevel gears.

When the wheel-teeth are of precision-construction and are arranged and fitted in the foregoing manner,—especially when the gears are of hardened steel, to which my present improvements are particularly applicable,—the relatively and normally lesser wear of the teeth of the larger wheel is further reduced to the very lowest possible amount. At the same time, these highly perfected teeth of the larger wheel operate in the most perfect manner for utilizing such slow wearing away as does occur in the pinion tooth-faces, to continuously maintain those faces all in the most correct and accurate form and working condition, and of a true conjugate-curvature relatively to the teeth of the larger wheel. Thus by reason of its peculiar character, the said larger or master-wheel becomes an effective means and instrument for at once coacting with the smaller wheel or pinion, either as the driven or driving wheel and for reducing to a minimum and regulating the wear of the pinion, and thus secure a greatly extended "life" or period of practically unimpaired operation, under any given working conditions.

A further object is to furnish pairs of bevel gears in which the permissible variation in the actual working positions of the two gears may be of a relatively large amount, as compared with their accurate mathematical or theoretical positions, while maintaining a relatively high operational quality during a relatively long period of depreciation by wear, and while the gears are being shifted by wear or by the flexing of supporting frames, or otherwise into inaccurate axial positions. One advantage resulting from these qualities, and an advantage of obvious importance, is the correspondingly large range of adjustment which thus becomes practicable in these bevel-gears for the taking up of wear, thereby not only securing better service and longer life under given working conditions, but also securing a satisfactory operation under a wider variation in the actual working conditions.

This invention, as will now be evident, furnishes a means and system whereby bevel-gears operating correctly as skew-bevels, are readily and cheaply producible without resorting to the usual but difficult forms involving the hyperbola-of-revolution, and without resorting to the use of any non-conical form or construction. Furthermore, the skew-bevel-gears may now be made with the same economy and facility as non-skew bevel-gears, and may be produced in and by the same machines and appliances.

These improvements, therefore, practically eliminate from the gear-making art, one of its most difficult and unsatisfactory branches, and thus makes available for a wide range of applications, the valuable features of the skew-bevel arrangements of gearing for use in many situations where, hitherto, the difficulty of manufacture and consequent high-cost have been prohibitive.

Having thus described my invention, I claim:—

1. The herein described improvement in bevel-gearing, it consisting of a pair of conical meshing gear-wheels comprising a master-wheel having the pinion-engaging tooth-surfaces thereof consisting of plane-surfaces each of which comprises face and flank areas located in one plane, and said tooth-surface planes being arranged in pairs in which the planes thereof are transversely converging and are also arranged in longitudinal parallelism.

2. The herein described improvement in bevel-gearing, it consisting of a pair of conical meshing gear-wheels comprising a master-wheel having the pinion-engaging tooth-surfaces thereof consisting of plane-surfaces each of which comprises face and flank areas located in one plane, and said tooth-surface planes being arranged in pairs in which the planes thereof are transversely and inwardly converging and are also arranged in longitudinal parallelism.

3. The herein described improvement in bevel-gearing, it consisting of a pair of conical meshing gear-wheels comprising a master-wheel having the pinion-engaging tooth-surfaces thereof each consisting of a working surface area located all in one plane, and said tooth-surface planes being arranged in pairs in which the planes thereof are transversely converging and are also arranged in longitudinal parallelism and conforming to the single-reproduction configuration, in combination with a co-meshing pinion having the wheel-engaging tooth-surfaces thereof curved to conform to the compound-reproduction configuration, and said curved tooth-surfaces of the pinion being also geometrical envelops of the lines of contact of the pinion tooth-surface with said plane tooth-surfaces of the conical master-wheel.

4. The herein described improvement in bevel-gearing, it consisting of a pair of conical meshing gear-wheels comprising a master-wheel having the pinion engaging tooth-surfaces thereof each consisting of a working surface area located all in one plane, and said tooth-surface planes being arranged in pairs in which the planes thereof are transversely and inwardly converging and are also arranged in longitudinal parallelism and conforming to the single-reproduction configuration, in combination with a co-meshing pinion having the wheel-engaging tooth-surfaces thereof curved to conform to the compound-reproduction configuration, and said curved tooth-surfaces of the pinion being also geometrical envelops of the lines of contact of the pinion tooth-surface with said plane tooth-surfaces of the conical master-wheel.

5. The herein described improvement in toothed-gearing, it consisting of a pair of bevel-gears, comprising a conical pinion in combination with a master-wheel having the pinion-engaging toothed-surfaces thereof consisting of plane-surfaces arranged in successive pairs in which each pair has the planes thereof transversely converging and also arranged in longitudinal-parallelism and conforming to the single-reproduction configuration, the said wheel-teeth being each located between two adjacent said tooth-surface planes, and said pinion having the wheel-engaging tooth-surfaces thereof curved to conform to the compound-reproduction configuration.

6. The herein described improvement in toothed-gearing, it consisting of a pair of bevel-gears, comprising a conical pinion in combination with a master-wheel having the pinion-engaging toothed-surfaces thereof consisting of plane-surfaces arranged in successive pairs in which each pair has the planes thereof transversely and inwardly converging and also arranged in longitudinal-parallelism and conforming to the single-reproduction configuration, the said wheel-teeth being each located between two adjacent said tooth-surface planes, and said pinion having the wheel-engaging tooth-surfaces thereof curved to conform to the compound-reproduction configuration.

7. The herein described improvement in toothed-gearing, it consisting of a pair of bevel-gears, comprising a conical pinion of relatively small cone-angle in combination with a master-wheel having a relatively larger cone-angle and having the pinion-engaging tooth-surfaces thereof consisting of plane-surfaces arranged in pairs in which the planes thereof are transversely and inwardly converging and are also arranged in and conforming to the single-reproduction configuration, said wheel-teeth being each located between two said tooth-surface planes, and said pinion having the wheel-engaging tooth-surfaces thereof curved to conform to the compound-reproduction configuration.

8. The herein described improvement in toothed-gearing, it consisting of a pair of bevel gears comprising a conical pinion of relatively small cone-angle, in combination with a conical master-wheel having a relatively larger cone-angle and having the pinion-engaging tooth-surfaces thereof consisting of plane-surfaces arranged in successive pairs in which each pair has the planes thereof transversely converging and also arranged in longitudinal-parallelism, and having the adjacent planes of any two adjacent said pairs located with a longitudinal angle greater than the angle subtended by the tooth-arc, the said wheel-teeth being each located between two adjacent said tooth-surface planes, and said pinion having the wheel-engaging tooth-surfaces thereof curved to conform to the compound-reproduction configuration.

9. The herein described improvement in toothed gearing, it consisting of a pair of bevel gears, comprising a conical pinion of relatively small cone-angle, in combination with a conical master-wheel having a relatively larger cone-angle and having the pinion engaging tooth-surfaces thereof consisting of plane-surfaces arranged in successive pairs in which each pair has the planes thereof transversely and inwardly converging and also arranged in longitudinal-parallelism and conforming to the single reproduction configuration, and having the adjacent planes of any two adjacent said pairs located with a longitudinal angle greater than the angle subtended by the tooth-arc, the said wheel-teeth being each located between two adjacent said tooth-surface planes, and said pinion having the wheel-engaging tooth-surfaces thereof curved to conform to the compound reproduction configuration.

10. The herein described improvement in toothed-gearing it consisting of a pair of bevel gears comprising a conical pinion of relatively small cone-angle, in combination with a conical master-wheel having a relatively larger cone-angle and having the pinion engaging tooth-surfaces thereof consisting of plane-surfaces arranged in successive pairs in which each pair has the planes thereof transversely and inwardly converging and also arranged in longitudinal-parallelism and conforming to the single reproduction-configuration, and having the adjacent planes of any two adjacent said pairs located with a longitudinal angle greater than the angle subtended by the tooth-arc, the said wheel-teeth being each located between one of the pairs of the adjacent tooth-surface planes which have a transverse convergence combined with a longitudinal-angle greater than the angle subtended by the pitch-arc, and said pinion having the wheel-engaging tooth-surfaces thereof curved to conform to the compound reproduction configuration.

11. In bevel gearing, a gear-wheel having the teeth thereof provided with plane-surface working-faces arranged in transverse convergence and having each said working-face coincident with a geometric plane which is in parallel with a master-form-axis having the outer end thereof located at the intersection in the surface of the geometric wheel-including sphere of two great-circles relatively to which the profile-lines at and of the outer ends of said geometric planes are located in circles off-set from said great-circles, and said working-faces having throughout the surfaces thereof surface-element lines in parallel with each other and with said master-form axis.

12. In bevel gearing, a gear-wheel having the teeth thereof provided with plane-surface working-faces arranged in transverse and inward convergence and having each said working-face coincident with a geometric plane which is in parallel with a master-form-axis having the outer end thereof located at the intersection in the surface of the geometric wheel-including sphere of two great-circles relatively to which the profile-lines at and of the outer ends of said geometric planes are located in circles offset from said great-circles, and said working-faces having throughout the surfaces thereof surface-element lines in parallel with each other and with said master-form axis.

13. In bevel gearing, a gear-wheel having the teeth thereof provided with plane-surface working-faces arranged in transverse convergence and having each said working-face coincident with a geometric plane which is in parallel with a master-form-axis that is located on a skew-angle relatively to the center of the geometric wheel-including sphere, the outer end of said form-axis being located at the intersection in the surface of said sphere of two great-circles relatively to which the profile-lines at and of the outer ends of said geometric planes are located in circles offset from said great-circles, and said working faces having throughout the surfaces thereof surface-element lines in parallel with each other and with said master-form axis, whereby the wheel in addition to having the skew-located teeth may also have plane-surface working-faces arranged in longitudinally parallel pairs non-radial to the wheel axis.

14. In bevel gearing, a gear-wheel having the teeth thereof provided with plane-surface working-faces arranged in transverse and inward convergence and having each said working-face coincident with a geometric plane which is in parallel with a master-form-axis that is located on a skew-angle relatively to the center of the geometric wheel-including sphere, the outer end of said form-axis being located at the intersection in the surface of said sphere of two great-circles relatively to which the profile-lines at and of the outer ends of said geometric planes are located in circles off-set from said great-circles, and said working-faces having throughout the surfaces thereof surface-element lines in parallel with each other and with said master-form-axis, whereby the wheel in addition to having the skew-located teeth may also have plane-surface working-faces arranged in longitudinally-parallel pairs non-radial to the wheel axis.

15. The herein described improvement in toothed-gearing, it consisting of a pair of bevel gears comprising a wheel and a pinion, and having the direction of the wheel-axis as located in a plane which is parallel to the pinion-axis, substantially at right-angles to the direction of the pinion-axis as located in a plane which is parallel to the wheel-axis, said pair of gears comprising a conical pinion having a pitch-cone inclusive angle of less than ninety degrees, in combination with a master-wheel having a pitch-cone inclusive angle of more than ninety degrees, and having the pinion engaging-tooth-surfaces thereof consisting of plane surfaces arranged in two series of pairs in which a pair of one series comprises the adjacent planes of two adjacent pairs of the other series, the planes of one series of pairs being transversely converging and also arranged in longitudinal parallelism and conforming to the single reproduction configuration, and the pairs of planes of the other series having a longitudinal angle corresponding to the angle subtended by the pitch-arc, said wheel teeth being each located between the two tooth-surface planes of a pair in one of said series, and said pinion having the wheel engaging-tooth-surfaces thereof curved to conform to the compound configuration, and consisting of geometrical envelops of the lines of contact of the pinion tooth-surface with said tooth-surface planes of the wheel.

16. The herein described improvement in toothed-gearing, it consisting of a pair of bevel gears comprising a wheel and a pinion, and having the direction of the wheel-axis as located in a plane which is parallel to the pinion-axis, substantially at right-angles to the direction of the pinion-axis as located in a plane which is parallel to the wheel-axis, said pair of gears comprising a conical pinion having a pitch-cone inclusive angle of less than ninety degrees, in combination with a master-wheel having a pitch-cone inclusive angle of more than ninety degrees, and having the pinion engaging-tooth-surfaces thereof consisting of plane surfaces arranged in two series of pairs in which a pair of one series comprises the adjacent planes of two adjacent pairs of the other series, the planes of one series of pairs being transversely and inwardly converging and also arranged in longitudinal parallelism and conforming to the single reproduction configuration, and the pairs of planes of the other series having a longitudinal angle corresponding to the angle subtended by the pitch-arc, said wheel teeth being each located between the two tooth-surface planes of a pair in the series which has the longitudinal angle corresponding to the angle subtended by the pitch-arc, and said pinion having the wheel engaging tooth-surfaces thereof curved to conform to the compound reproduction configuration, and consisting of geometrical envelops of the lines of contact of the pinion tooth-surface with said tooth-surface planes of the wheel.

17. The herein described improvement in toothed-gearing, it consisting of a pair of bevel gears comprising a wheel and a pinion, and having the direction of the wheel-axis as located in a plane which is parallel to the pinion-axis, substantially at right-angles to the direction of the pinion-axis as located in a plane which is parallel to the wheel-axis, said pair of gears comprising a conical pinion having a pitch-cone inclusive angle of less than ninety degrees in combination with a master-wheel having a pitch-cone inclusive angle of more than ninety degrees, and having the pinion-engaging-tooth-surfaces thereof consisting of plane-surfaces arranged in two series of pairs in which a pair of one series comprises the adjacent planes of two adjacent pairs of the other series, the planes of one series of pairs being transversely converging and also arranged in longitudinal parallelism and conforming to the single reproduction configuration, and the pairs of planes of the other series having a longitudinal angle corresponding to the angle subtended by the pitch-arc, said wheel teeth being each located between the two tooth-surface planes of a pair in one of said series, and said pinion being of a non-normal diameter and having the wheel engaging tooth-surfaces thereof curved to conform to the compound reproduction configuration, and consisting of geometrical envelops of the lines of contact of the pinion tooth-surface with said tooth-surface planes of the wheel.

18. The herein described improvement in toothed-gearing, it consisting of a pair of bevel gears comprising a wheel and a pinion, and having the direction of the wheel-axis as located in a plane which is parallel to the pinion-axis, substantially at right-angles to the direction of the pinion-axis as located in a plane which is parallel to the wheel-axis, said pair of gears comprising a conical pinion having a pitch-cone inclusive angle of less than ninety degrees in combination with a master-wheel having a pitch-cone inclusive angle of more than ninety degrees, and having the pinion-engaging tooth-surfaces thereof consisting of plane surfaces arranged in two series of pairs in which a pair of one series comprises the adjacent planes of two adjacent pairs of the other series, the planes of one series of pairs being transversely and inwardly converging and also arranged in longitudinal parallelism and conforming to the single reproduction configuration, and the pairs of planes of the other series having a longitudinal angle corresponding to the angle subtended by the pitch-arc, said wheel teeth being each located between the two tooth-surface planes of a pair in the series which has the longitudinal angle corresponding to the angle subtended by the pitch-arc, and said pinion being of a non-normal diameter and having the wheel engaging tooth-surfaces thereof curved to conform to the compound reproduction configuration, and consisting of geometrical envelops of the lines of contact of the pinion tooth-surface with said tooth-surface planes of the wheel.

19. The herein described improvement in toothed-gearing, it consisting of a pair of bevel gears comprising a wheel and a pinion having the axes of rotation thereof with a skew location one relatively to the other and having the direction of the wheel-axis as located in a plane which is parallel to the pinion axis, substantially at right-angles to the direction of the pinion axis as located in a plane which is parallel to the wheel-axis, said pair of gears comprising a conical pinion having a pitch-cone inclusive angle of less than ninety degrees, in combination with a master-wheel having a pitch-cone inclusive angle of more than ninety degrees, and having the pinion engaging-tooth-surfaces thereof consisting of plane-surfaces arranged in two series of pairs in which a pair of one series comprises the adjacent planes of two adjacent pairs of the other series, the planes of one series of pairs being transversely converging and also arranged in longitudinal parallelism and conforming to the single reproduction configuration, and the pairs of planes of the other series having a longitudinal angle corresponding to the angle subtended by the pitch-arc, said wheel teeth being each located between the two tooth-surface planes of a pair in one of said series, and said pinion being of a non-normal diameter and having the wheel engaging tooth-surfaces thereof curved to conform to the compound reproduction configuration, and consisting of geometrical envelops of the lines of contact of the pinion tooth-surface with said tooth-surface planes of the wheel.

20. The herein described improvement in toothed-gearing, it consisting of a pair of bevel gears comprising a wheel and a pinion having the axes of rotation thereof with a skew location one relatively to the other and having the direction of the wheel-axis as located in a plane which is parallel to the pinion axis, substantially at right-angles to the direction of the pinion axis as located in a plane which is parallel to the wheel-axis, said pair of gears comprising a conical pinion having a pitch-cone inclusive angle of less than ninety degrees, in combination with a master-wheel having a pitch-cone inclusive angle of more than ninety degrees, and having the pinion-engaging tooth-surfaces thereof consisting of plane-surfaces arranged in two series of pairs in which a pair of one series comprises the adjacent planes of two adjacent pairs of the other series, the planes of one series of pairs being transversely and inwardly converging and also arranged in longitudinal parallelism and conforming to the single reproduction configuration, and the pairs of planes of the other series having a longitudinal angle corresponding to the angle subtended by the pitch-arc, said wheel teeth being each located between the two tooth-surface planes of a pair in the series which has the longitudinal angle corresponding to the angle subtended by the pitch-arc, and said pinion being of a non-normal diameter and having the wheel engaging tooth-surfaces thereof curved to conform to the compound reproduction configuration, and consisting of geometrical envelops of the lines of contact of the pinion tooth-surface with said tooth-surface planes of the wheel.

21. In bevel-gearing, a conical master-wheel having skew-located plane-surface tooth-faces which are arranged in transversely converging pairs and are also arranged in tooth pairs which have a longitudinal face-angle greater than the angle subtended by the tooth-arc, in combination with a mating pinion having tooth-faces which are conjugate geometrical envelops of the lines of contact of the pinion tooth-surface with said plane-surface tooth-faces of the wheel, substantially as described.

22. In bevel-gearing, a conical master-wheel having skew-located plane-surface tooth-faces which are arranged in transversely converging pairs and are also arranged in tooth pairs which have a longitudinal face-angle corresponding to the pitch angle, and a mating pinion having tooth-faces which are conjugate geometrical envelops of the lines of contact of the pinion tooth-surface with said plane-surface tooth-faces of the wheel, substantially as described.

23. In bevel-gearing, a conical master-wheel having skew-located plane-surface tooth-faces which are arranged in transversely and inwardly converging pairs and are also arranged in tooth-pairs which have a longitudinal face-angle greater than the angle subtended by the tooth-arc, in combination with a mating pinion having tooth-faces which are conjugate geometrical envelops of the lines of contact of the pinion tooth-surface with said plane-surface tooth-faces of the wheel, substantially as described.

24. In bevel-gearing, a conical master-wheel having skew-located plane-surface tooth-faces which are arranged in transversely and inwardly converging pairs and are also arranged in tooth-pairs which have a longitudinal face-angle corresponding to the pitch-angle, and a mating pinion having tooth-faces which are conjugate geometrical envelops of the lines of contact of the pinion tooth-surface with said plane-surface tooth-faces of the wheel, substantially as described.

25. In bevel-gearing, a conical master-wheel in which each tooth thereof is provided with two plane-surface tooth-faces having a skew-location relatively to each other, and that are arranged in transversely converging pairs and are also arranged in tooth-pairs having a longitudinal face-angle greater than the angle subtended by the tooth-arc and having a skew-location relatively to the wheel-axis, in combination with a mating pinion having tooth-faces which are conjugate geometrical envelops of the lines of contact of the pinion tooth-surface with said plane-surface skew-located faces and pairs of faces of the wheel, substantially as described.

26. In bevel-gearing, a conical master-wheel in which each tooth thereof is provided with two plane-surface tooth-faces having a skew-location relatively to each other, and which are arranged in transversely and inwardly converging pairs and are also arranged in tooth-face pairs having a longitudinal angle corresponding to the pitch-angle, and having a skew-location relatively to the wheel-axis and a mating pinion having tooth-faces which are conjugate geometrical envelops of the lines of contact of the pinion tooth-surface with said skew-located plane-surface faces, and pairs of faces of the wheel, substantially as described.

27. In bevel-gearing, a conical master-wheel having skew-located plane-surface tooth-faces arranged in two series of transversely-converging pairs in which the adjacent faces of the pairs of one series constitute the pairs of the other series, and in which each face of a pair in one series has an angular advance varying from that of the corresponding face in the pairs of the other series, and having the faces comprising the pairs in one series arranged in longitudinal parallelism and the adjacent faces of the other series located with a longitudinal-angle greater than the angle subtended by the tooth-arc, and having the faces comprised in the pairs of one series arranged in inward-convergence, in combination with a mating pinion having its teeth with working surfaces conjugate to the said transversely-converging plane-surface faces of one of said pairs, substantially as described.

28. In bevel-gearing, a conical master-wheel having skew-located plane-surface tooth faces arranged in two series of transversely-converging pairs in which the adjacent faces of the pairs of one series constitute the pairs of the other series, and in which each face of a pair in one series has an angular advance varying from that of the corresponding face in the pairs of the other series, and having the faces comprising the pairs in one series arranged in longitudinal parallelism and the adjacent faces of the other series located with a longitudinal-angle substantially corresponding with the pitch-angle, and having the faces comprised in the pairs of one series arranged in inward-convergence, in combination with a mating pinion having its teeth with working surfaces conjugate to the said inwardly-converging plane-surface faces of the wheel, substantially as described.

29. In bevel-gearing, a conical master-wheel having skew-located plane-surface tooth-faces arranged in two series of transversely-converging pairs in which the adjacent faces of the pairs of one series constitute the pairs of the other series, and in which each face of a pair in one series has an angular advance varying from that of the corresponding face in the pairs of the other series; and having the faces comprising the pairs in one series arranged in longitudinal parallelism and inward-convergence, and in each set of three successive tooth-faces having two adjacent faces comprised in a pair in one said series, and two adjacent faces comprised in a pair having the inward convergence, in combination with a mating pinion having its teeth with curved surface working-faces conjugate to the said transversely-converging faces of one of said pairs, substantially as described.

30. In bevel-gearing, a conical master-wheel having skew-located plane-surface tooth-faces arranged in two series of transversely-converging pairs, in which the adjacent faces of the pairs of one series constitute the pairs of the other series, and in which each face of a pair in one series has an angular advance varying from that of the corresponding face in the pairs of the other series; and having the faces comprising the pairs in one series arranged in longitudinal parallelism and inward-convergence, and in each set of three successive tooth-faces having two adjacent faces comprised in a pair in one said series, and two adjacent faces comprised in a pair having the inward convergence, in combination with a mating pinion having its teeth with curved surface working-faces conjugate to the said inwardly-converging plane-surface faces of the wheel, substantially as described.

HARVEY D. WILLIAMS.

Witnesses:
JOHN MORRIS,
FRED. J. DOLE.